United States Patent
Artan et al.

(10) Patent No.: US 7,805,460 B2
(45) Date of Patent: Sep. 28, 2010

(54) GENERATING A HIERARCHICAL DATA STRUCTURE ASSOCIATED WITH A PLURALITY OF KNOWN ARBITRARY-LENGTH BIT STRINGS USED FOR DETECTING WHETHER AN ARBITRARY-LENGTH BIT STRING INPUT MATCHES ONE OF A PLURALITY OF KNOWN ARBITRARY-LENGTH BIT STRING

(75) Inventors: Nabi Sertac Artan, Brooklyn, NY (US); H. Jonathan Chao, Holmdel, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 511 days.

(21) Appl. No.: 11/978,216

(22) Filed: Oct. 26, 2007

(65) Prior Publication Data

US 2008/0133583 A1    Jun. 5, 2008

Related U.S. Application Data

(60) Provisional application No. 60/854,770, filed on Oct. 26, 2006.

(51) Int. Cl.
*G06F 7/00* (2006.01)
*G06F 17/00* (2006.01)

(52) U.S. Cl. ..................... 707/791; 707/797

(58) Field of Classification Search .............. 707/700, 707/736, 745, 747, 791, 797; 370/792; 341/50
See application file for complete search history.

(56) References Cited

U.S. PATENT DOCUMENTS

| | | | | |
|---|---|---|---|---|
| 6,212,184 B1 * | 4/2001 | Venkatachary et al. | ...... | 370/392 |
| 6,675,163 B1 * | 1/2004 | Bass et al. | ...... | 1/1 |
| 7,089,240 B2 * | 8/2006 | Basso et al. | ...... | 1/1 |
| 7,092,954 B1 * | 8/2006 | Ramesh | ...... | 1/1 |
| 2004/0236720 A1 * | 11/2004 | Basso et al. | ...... | 707/1 |
| 2006/0173831 A1 * | 8/2006 | Basso et al. | ...... | 707/3 |
| 2008/0111716 A1 | 5/2008 | Artan et al. | | |

OTHER PUBLICATIONS

C. Burns and D. Newman. (Jan. 2006) "Vendors Choose to Tout Disparate Application-Acceleration Techniques," http://www.networkworld.com/reviews/2006/011606-wfe-features.html (downloaded Apr. 10, 2010).

S. Singh, C. Estan, G. Varghese, and S. Savage, "Automated Worm Fingerprinting," *Proc. of the ACM/USENIX Symposium on Operating System Design and Implementation*, San Francisco, CA, Dec. 2004.

(Continued)

*Primary Examiner*—Hung T Vy
(74) *Attorney, Agent, or Firm*—Straub, & Pokotylo; John C. Pokotylo

(57) ABSTRACT

Generating and using a high-speed, scalable, and easily updateable data structure are described. The proposed data structure provides minimal perfect hashing functionality while intrinsically supporting low-cost set-membership queries. In other words, in some embodiments, it provides at most one match candidate in a set of known arbitrary-length bit strings that is used to match the query.

25 Claims, 15 Drawing Sheets

OTHER PUBLICATIONS http://www.snort.org (downloaded Apr. 10, 2010).

F. Yu, T. Lakshman, and R. Katz, "Gigabit Rate Pattern-Matching Using Tcam," *Int. Conf. on Network Protocols*, (ICNP), Berlin, Germany, Oct. 2004.

H. Song and J. Lockwood, "Multi-Pattern Signature Matching for Hardware Network Intrusion Detection Systems," *IEEE Globecom*, 2005, Nov.-Dec. 2005.

J. Moscola, J. Lockwood, R. P. Loui, and M. P., "Implementation Of A Content-Scanning Module for an Internet Firewall." *FCCM*, 2003, pp. 31-38.

C. Clark and D. Schimmel, "Scalable Pattern Matching for Highspeed Networks," *IEEE Symposium on Field-Programmable Custom Computing Machines (FCCM)*, Napa, California, 2004, pp. 249-257.

Y. H. Cho and W. H. Mangione-Smith, "Fast Reconfiguring Deep Packet Filter For 1+ Gigabit Network." *FCCM*, 2005, pp. 215-224.

Z. K. Baker and V. K. Prasanna, "High-Throughput Linked-Pattern Matching For Intrusion Detection Systems," *Proceedings of the First Annual ACM Symposium on Architectures for Networking and Communications Systems*, 2005.

N. Tuck, T. Sherwood, B. Calder, and G. Varghese, "Deterministic Memory-Efficient String Matching Algorithms for Intrusion Detection," *Proc. of the 2004 IEEE Infocom Conference*, 2004.

I. Sourdis, D. Pnevmatikatos, S. Wong, and S. Vassiliadis, "A Reconfigurable Perfect-Hashing Scheme for Packet Inspection," *Proc. 15th International Conference on Field Programmable Logic and Applications (FPL2005)*, Aug. 2005, pp. 644-647.

L. Tan and T. Sherwood, "Architectures for Bit-Split String Scanning in Intrusion Detection," *IEEE Micro*, Jan.-Feb. 2006.

G. Papadopoulos and D. N. Pnevmatikatos, "Hashing + Memory = Low Cost, Exact Pattern Matching." *Proc. 15th International Conference on Field Programmable Logic and Applications (FPL)*, Aug. 2005, pp. 39-44.

A. Aho and M. J. Corasick, "Efficient String Matching: An Aid to Bibliographic Search," *Communications of the ACM*, vol. 18, No. 6, pp. 333-340, 1975.

H.-J. Jung, Z. K. Baker, and V. K. Prasanna, "Performance Of FPGA Implementation of Bit-Split Architecture For Intrusion Detection Systems," *Proceedings of the Reconfigurable Architectures Workshop at IPDPS (RAW '06)*, 2006.

K. Anagnostakis, S. Antonatos, E. Markatos, and M. Polychronakis, "E2xb: A Domain-Specific String Matching Algorithm For Intrusion Detection," *Proc. of the 18th IFIP International Information Security Conference*, 2003.

S.Dharmapurikar, P.Krishnamurthy, T. Sproull, and J. Lockwood, "Deep Packet Inspection Using Parallel Bloom Filters," *Symposium on High Performance Interconnects* (HotI), Stanford, CA, Aug. 2003, pp. 44-51.

H. Song, T. Sproull, M. Attig, and J. Lockwood, "Snort Offloader: A Reconfigurable Hardware Nids Filter," *15th International Conference on Field Programmable Logic and Applications (FPL2005)*, Tampere, Finland, Aug. 2005.

B. Bloom, "Space/Time Trade-Offs In Hash Coding With Allowable Errors," *Communications of the ACM*, vol. 13, No. 7, 1970.

B. Hayes, "The Easiest Hard Problem," *American Scientist*, vol. 90, no. Mar.-Apr., pp. 113-117, 2002.

S. Dharmapurikar and J. Lockwood, "Fast and Scalable Pattern Matching For Content Filtering," *Symposium on Architectures for Networking and Communications Systems (ANCS)*, Oct. 2005.

Yi Lu, Balaji Prabhakar, Flavio Bonomi, "Perfect Hashing for Network Applications," *ISIT* (Jul. 2006).

* cited by examiner

| Bin No.   | 0 | 1 | 2   | 3 | 4  | 5 | 6 | 7 |
|-----------|---|---|-----|---|----|---|---|---|
| Occupancy | 0 | 0 | 2   | 0 | 0  | 1 | 0 | 1 |
| Item list | - | - | 1,4 | - | -  | 3 | - | 2 |

FIGURE 7

GENERATING A HIERARCHICAL DATA STRUCTURE ASSOCIATED WITH A PLURALITY OF KNOWN ARBITRARY-LENGTH BIT STRINGS USED FOR DETECTING WHETHER AN ARBITRARY-LENGTH BIT STRING INPUT MATCHES ONE OF A PLURALITY OF KNOWN ARBITRARY-LENGTH BIT STRING

§0. PRIORITY CLAIM

This application claims the benefit of U.S. Provisional Patent Application Ser. No. 60/854,770 (incorporated herein by reference and referred to as "the '770 provisional"), titled "TriBiCa: TRIE BITMAP CONTENT ANALYZER FOR HIGH-SPEED NETWORK INTRUSION DETECTION," filed on Oct. 26, 2006, and listing Sertac Artan and Hung-Hsiang Jonathan Chao as inventors. The present invention in not limited to requirements of the particular embodiments described in the '770 provisional.

§1. BACKGROUND OF THE INVENTION

§1.1 Field of the Invention

The present invention concerns matching an arbitrary-length bit string with one of a number of known arbitrary length bit strings. The present invention may be used for network intrusion detection and prevention. In particular, the present invention concerns a novel data structure namely, a trie bitmap content analyzer, which provides minimum perfect hashing functionality while supporting low-cost set membership queries. By using such a data structure, matching can be checked at high speed.

§1.2 Background Information

High-speed Network Intrusion Detection and Prevention Systems ("NIDPS") have gained a lot of attention recently as part of the effort to keep up with the ever-increasing bandwidth requirement of today's networks. The most time-consuming task of NIDPS is Deep Packet Inspection ("DPI"). DPI also has applications in other networking areas, such as layer-7 switching, URL inspection, and spam, virus, and worm detection (C. Burns and D. Newman. (2006, January). Vendors choose to tout disparate application-acceleration techniques. Available: http://www.networkworld.com/reviews/2006/011606-wfe-features.html), (S. Singh, C. Estan, G. Varghese, and S. Savage, "Automated worm fingerprinting," in *Proc. of the ACM/USENIX Symposium on Operating System Design and Implementation*, San Francisco, Calif., December 2004.). DPI is the task of searching for a static or dynamic set of strings within each incoming packet. In the NIDPS context, DPI searches for pre-defined attack signatures in the incoming packets so as to identify malicious content.

Unlike most network applications, such as IP lookup and packet classification, whose complexity is proportional to the packet rate in packets/sec, DPI's complexity is determined by the data rate in bytes/sec, making it computationally harder than other applications. DPI's complexity is also increased by the number and length of strings in the set (signatures). As a result, the issue of designing a DPI system that is scalable in processing speed independent of the string set remains a challenge. Moreover, the application may have a dynamic signature set that is updated when necessary. Although in NIDPS these updates are relatively infrequent, the need to easily update the NIDPS signature set when required is still a challenge and often creates conflicts when designing a high-speed system.

§1.2.1 Previous Approaches and Perceived Limitations of Such Approaches

Present software DPI methods are typically not scalable for high-speeds (SNORT, available at: http://www.snort.org) because general-purpose hardware running software DPI is intrinsically slow and has limited parallelism. Hence, only hardware approaches are discussed. Research to increase the DPI speed focuses on two aspects: (1) increasing the speed of unit inspection operation (i.e., operation for each byte of the incoming packet), and (2) reducing the number of DPI operations by identifying possible malicious packets at the early stages of the inspecting process, while passing most of the packets that are legitimate.

To increase the speed of detection, some approaches use external memory structures (F. Yu, T. Lakshman, and R. Katz, "Gigabit rate pattern-matching using tcam," in *Int. Conf. on Network Protocols (ICNP)*, Berlin, Germany, October 2004.), (H. Song and J. Lockwood, "Multi-pattern signature matching for hardware network intrusion detection systems," in *IEEE Globecom* 2005, November-December 2005.) such as TCAMs, SRAMs or both. The former is more expensive and consumes more power, while the latter suffers from speed limitation. Other approaches implement the DPI on a single-chip (most of the time on a single FPGA). The first generation of the single-chip solutions (J. Moscola, J. Lockwood, R. P. Loui, and M. P., "Implementation of a content-scanning module for an internet firewall." in *FCCM*, 2003, pp. 31-38.); (C. Clark and D. Schimmel, "Scalable pattern matching for high-speed networks," in *IEEE Symposium on Field-Programmable Custom Computing Machines (FCCM)*, Napa, Calif., 2004, pp. 249-257.); (Y. H. Cho and W. H. Mangione-Smith, "Fast reconfiguring deep packet filter for 1+ gigabit network." in *FCCM*, 2005, pp. 215-224.); Z. K. Baker and V. K. Prasanna, "High-throughput Linked-Pattern Matching for Intrusion Detection Systems," in *Proceedings of the First Annual ACM Symposium on Architectures for Networking and Communications Systems*, 2005.); and (N. Tuck, T. Sherwood, B. Calder, and G. Varghese, "Deterministic memory-efficient string matching algorithms for intrusion detection," in *Proc. of the 2004 IEEE Infocom Conference*, 2004.), with the exception of (N. Tuck, T. Sherwood, B. Calder, and G. Varghese, "Deterministic memory-efficient string matching algorithms for intrusion detection," in *Proc. of the 2004 IEEE Infocom Conference*, 2004.), tailor string matching circuits to the input set. Although it is high-speed, it requires hardware reconfiguration for updates.

A recent proposal (I. Sourdis, D. Pnevmatikatos, S. Wong, and S. Vassiliadis, "A reconfigurable perfect-hashing scheme for packet inspection," in *Proc. 15$^{th}$ International Conference on Field Programmable Logic and Applications (FPL 2005)*, August 2005, pp. 644-647.) takes a hybrid approach, using reconfigurable circuits and on-chip memory. The approach in (I. Sourdis, D. Pnevmatikatos, S. Wong, and S. Vassiliadis, "A reconfigurable perfect-hashing scheme for packet inspection," in *Proc. 15$^{th}$ International Conference on Field Programmable Logic and Applications (FPL 2005)*, August 2005, pp. 644-647.) use perfect hashing (though not minimal perfect hashing), but requires reconfiguration and has less than 100% signature memory utilization due to using perfect hashing rather than minimal perfect hashing. In (Y. Lu, B. Prabhakar, and F. Bonomi, "Perfect hashing for network applications," in *IEEE Symposium on Information Theory*), Seattle, Wash., 2006, pp. 2774-2778.), a minimal perfect hashing scheme is provided with $O(\eta)$ space complexity and low construction time. This approach, however, requires a complex addressing scheme, where additional logic is required to calculate the address in the hash table, to locate the signature for an exact match. Other recent proposals such as (N. Tuck, T. Sherwood, B. Calder, and G. Varghese, "Deterministic memory-efficient string matching algorithms for intrusion detection," in *Proc. of the 2004 IEEE Infocom Conference*, 2004.), (L. Tan and T. Sherwood, "Architectures for bit-split string scanning in intrusion detection," *IEEE Micro*, January-February 2006.), (G. Papadopoulos and D. N. Pnevmatikatos, "Hashing+memory=low cost, exact pattern matching." in *Proc. 15th International Conference on Field Programmable Logic and Applications (FPL)*, August 2005, pp. 3944.) also use on-chip memory for signature-specific data and for avoiding hardware reconfiguration for updates.

The pioneering work on single-chip methods without reconfiguration for signature updates (N. Tuck, T. Sherwood, B. Calder, and G. Varghese, "Deterministic memory-efficient string matching algorithms for intrusion detection," in *Proc. of the 2004 IEEE Infocom Conference*, 2004.) set the stage by modifying the classical Aho-Corasick String Matching Algorithm (A. Aho and M. J. Corasick, "Efficient string matching: an aid to bibliographic search," *Communications of the ACM*, vol. 18, no. 6, pp. 333-340, 1975.) for hardware implementation. Authors in (L. Tan and T. Sherwood, "Architectures for bit-split string scanning in intrusion detection," *IEEE Micro*, January-February 2006.) use small state machines to further improve memory requirements and fit the entire Snort ([Online]. Available: http://Hwww.snort.org) signature database to 0.4 MB memory. It is claimed that it can run at 10 Gbps with an ASIC implementation. It is noteworthy that the ASIC-based solution has a technology advantage over other proposals, most of which are FPGA-based. Authors in (H.-J. Jung, Z. K. Baker, and V. K. Prasanna, "Performance of FPGA Implementation of Bit-split Architecture for Intrusion Detection Systems," in *Proceedings of the Reconfigurable Architectures Workshop at IPDPS (RAW '06)*, 2006.) later showed that FPGA implementation of (L. Tan and T. Sherwood, "Architectures for bit-split string scanning in intrusion detection," *IEEE Micro*, January-February 2006.) can achieve lower throughput while using larger memory. Authors in (G. Papadopoulos and D. N. Pnevmatikatos, "Hashing+memory=low cost, exact pattern matching." in *Proc. 15th International Conference on Field Programmable Logic and Applications (FPL)*, August 2005, pp. 3944.) use a sparse hash table to store signatures so that the hash collisions are minimized or, more likely, eliminated. Although the authors use indirection to improve memory utilization, it is still lower than many other proposals. In addition, the authors use glue logic to detect long patterns, which may require reconfiguration for signature updates.

Since most of the incoming packets are legitimate, running DPI for every single byte of an incoming packet is overkill. Methods exploring this property of intrusion detection were proposed to skip most of the legitimate packets through simple and fast pre-processing (K. Anagnostakis, S. Antonatos, E. Markatos, and M. Polychronakis, "E2xb: A domain-specific string matching algorithm for intrusion detection," in *Proc. of the 18th IFIP International Information Security Conference*, 2003.); (S. Dharmapurikar, P. Krishnamurthy, T. Sproull, and J. Lockwood, "Deep packet inspection using parallel bloom filters," in *Symposium on High Performance Interconnects (HotI)*, Stanford, Calif., August 2003, pp. 44-51.); (H. Song, T. Sproull, M. Attig, and J. Lockwood, "Snort offloader: A reconfigurable hardware nids filter," in *15th International Conference on Field Programmable Logic and Applications (FPL 2005)*, Tampere, Finland, August 2005.), thus significantly reducing the string matching operation that allows few queries before attempting any string matching. However, these methods still require additional full string matching for suspicious data, and do not improve the worst-case performance.

Each of the foregoing articles (in this section 1.2.1) is incorporated herein by reference.

§2. SUMMARY OF THE INVENTION

Embodiments consistent with the present invention provide a high-speed, scalable, and easily updateable data structure to address these challenges. Specifically, the data structure is relatively small and its size may scale with the number of strings and the average string size in the set. In addition, the updates can be achieved without hardware modifications. The proposed data structure, called TriBiCa (Trie Bitmap Content Analyzer), provides minimal perfect hashing functionality while intrinsically supporting low-cost set-membership queries. In other words, in some embodiments, it provides at most one match candidate in the signature set that is used to match the query.

In the context of communications networks, embodiments consistent with the present invention may filter out most of the irrelevant (i.e., legitimate) traffic without referring to any string matching operation and thus increases the average search rate. Following the data structure, at least some embodiments consistent with the present invention provide a hardware architecture that tailors this data structure to the NIDPS. The exemplary hardware architecture fits into a fraction of a modest FPGA without the need for any external memory. More specifically, using parallel engines, the exemplary hardware architecture can provide 10-Gbps throughput in the worst case on a Xilinx Virtex II Pro FPGA. If current state-of-the-art FPGAs are used, the proposed architecture can easily achieve DPI at 40 Gbps. The updates can be done through on-chip memory without any reconfiguration of the on-chip logic (i.e., without any hardware modification), allowing faster response to new attacks. Avoiding external memory access not only improves speed, but also allows parallel designs to fit into the same chip.

§3. BRIEF DESCRIPTION OF THE DRAWINGS

FIG. 7 illustrates an occupancy map of the node depicted in FIG. 5, consistent with the present invention.

§4. DETAILED DESCRIPTION

The present invention may involve novel methods, apparatus, message formats, and/or data structures to facilitate a high-speed architecture for determining whether or not an arbitrary-length bit string matches one of a number of known arbitrary-length bit strings. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§4.1 Exemplary Data Structure

The data structure of an exemplary Trie Bitmap Content Analyser (TriBiCa), is now described. Suppose, a set S with n items is stored in a table with exactly n slots and each slot stores a single item from S. The objective is to design a data structure that can represent this set S and respond to a membership query on S (1) by stating there is a possible match or not, and (2) if there is a match, pointing to a single possible match candidate in S (i.e., pointing to a single table slot) without any prior exact matching between the query and the items in the set. To achieve the latter objective requires finding a minimal perfect hash function for S, which maps each item of S into one of n consecutive integer values in the table without any collisions. To achieve the former objective, the data structure should skip most, if not all, of the non-element queries by providing a simple, low-cost set membership query mechanism.

Figure 1:
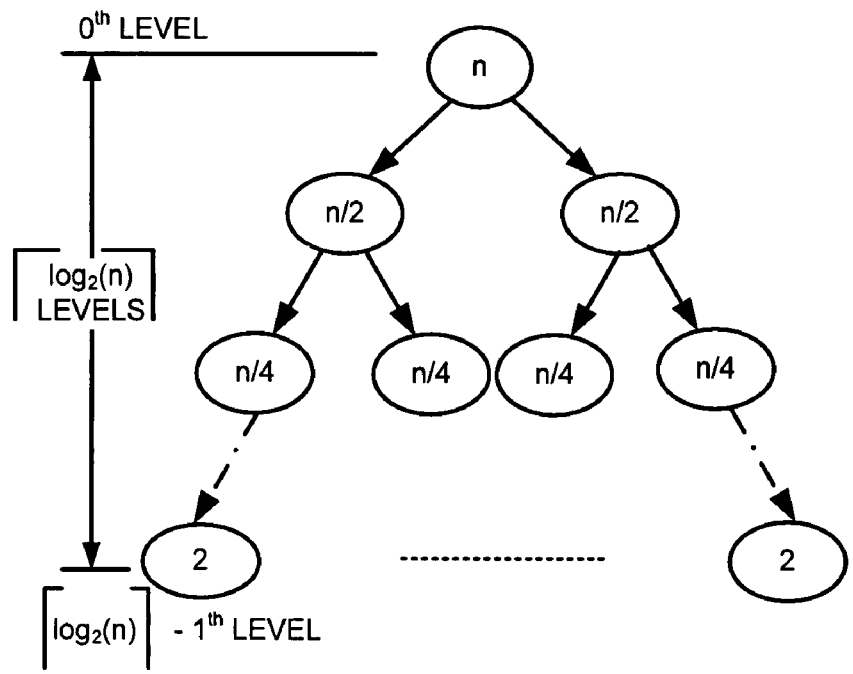
FIG. 1 illustrates a binary trie structure with $l=\lceil \log_2(n) \rceil$ levels where the root node is at level 0, consistent with the present invention.

The exemplary TriBiCa data structure may achieve minimal perfect hashing by carefully partitioning the n items into equal-sized groups at each level so that at the end, all n items are uniquely partitioned (one item per group). To illustrate the above described TriBiCa data structure, a simple example is provided. Assume a binary trie with $l=\lceil \log_2(n) \rceil$ levels where the root node is at level 0 as illustrated in FIG. 1. The root node of this trie has all the n elements of S. To simplify the given example, assume n is a power of two. Then, the next step is to arbitrarily partition the n items of the root node at level 0 into two equal-sized groups (n/2 each) and put one group to the left child node and the other to the right child node. Assume that there exists such a partitioning algorithm that can arbitrarily partition n items provided in a node into two equal-sized groups (n/2 each) wherein one group is placed to left child node and the other group to the right child node. Further, assume that an algorithm exists that will provide a query mechanism such that the correct group of a query item can be determined (these algorithms are described in later paragraphs). The operation of partitioning is then repeated in a recursive manner for each child node. More specifically, each child node will inherit precisely half of the items that belong to its parent. When a leaf node is reached, there will be two items in this node. The algorithm completes its partitioning by designating one of the items in each leaf node as the left child and the other as the right child. The path traversed from the root to each leaf node followed by the direction of an item in that node (left or right) is unique and thus defines a unique ID for each element of the set S. These IDs are used to address the table where S is stored providing a minimal perfect hash function for S.

Figure 2:
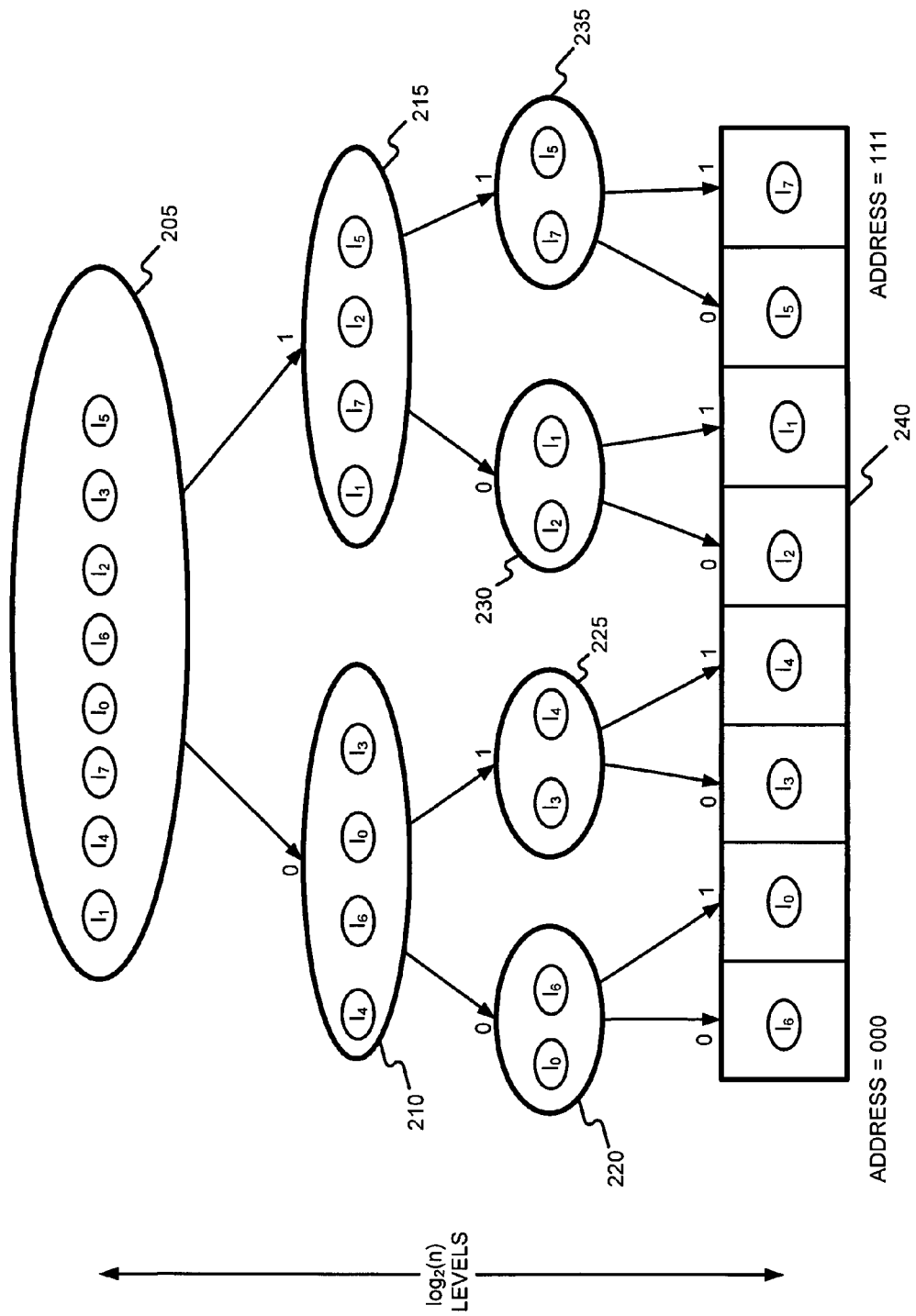
FIG. 2 illustrates a trie data structure having 8 items in its root node, wherein each item is minimal perfect hashed in a memory location, consistent with the present invention.

FIG. 2 is another example of an exemplary binary trie structure of TriBiCa wherein the root node 205 has 8 items (i.e., $I_0$-$I_7$). As illustrated in FIG. 2, at level 0 of the trie structure, these 8 items in the root node 205 will be partitioned by a partitioning algorithm into a left child node 210 inheriting 4 items out of the 8 items in the root node 205 and a right child node 215 inheriting the remaining 4 items in the root node. The above partitioning process by a partitioning algorithm is repeated at every level for every node of the trie structure until nodes containing only two items (i.e., nodes 220, 225, 230, and 235) have been partitioned thus designating one of the two items as a left child and the other item as a right child. For example, node 220 has two items, namely $I_0$ and $I_6$, wherein item $I_6$ is designated as a left child and item $I_0$ is designated as a right child. At this point, each of the 8 items is stored into a memory location 240 defined by an address derived based on the path traversed from the root node to each leaf node followed by the direction of an item in that node. For instance, starting from the root node 205 and defining a digit 0 to represent items grouped to the left and a digit 1 to represent items grouped to the right, item $I_0$ is first grouped to the left node 210, then the left node again 220, and finally the right node 220. Thus the address 001 designates the location wherein the item $I_0$ is to be stored in the memory 240. As illustrated in FIG. 2 item $I_0$ is stored in the memory address 001 of memory 240.

Figure 3:
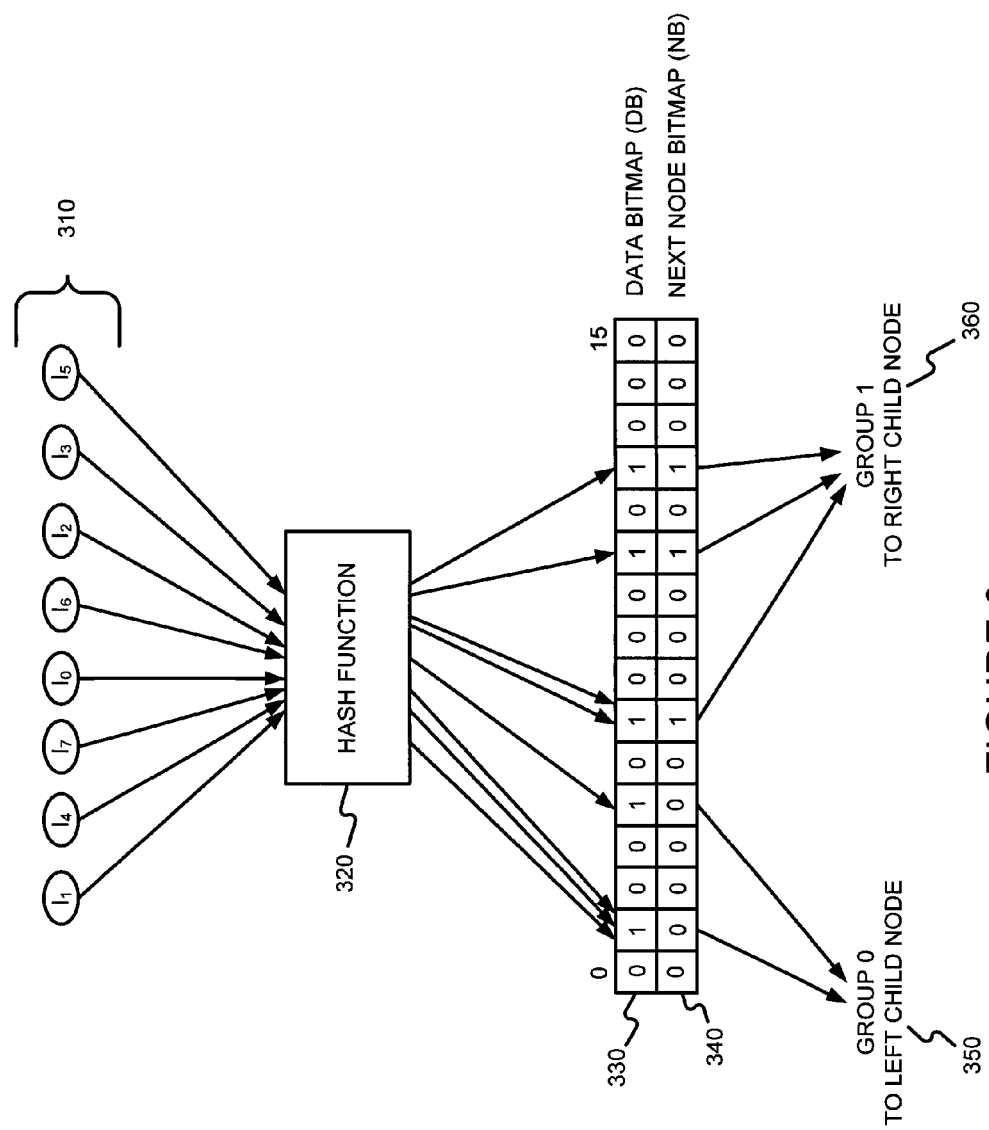
FIG. 3 illustrates components and the formation of an exemplary TriBiCa node in a manner consistent with the present invention.

An exemplary TriBiCa node is illustrated in FIG. 3. The exemplary TriBiCa node includes a data bitmap 330 and a next node bitmap 340. Items are inserted into each node by hashing. As depicted in FIG. 3, eight items (i.e., $I_0$-$I_7$) 310 are hashed by the hashing function 320 before setting the bit at the bit location within the data bitmap corresponding to the hashed results. For instance, according to the data bit map 330 which has 16 bit locations (i.e., 16-bit map) 3 of the 8 items 310 are hashed into location 1 of the data bit map, one item is hashed into location 4, two items in location 6, and so on until all items 310 are hashed into some location within the data bit map 330. Note that more than one item can be hashed into the same bit location of the bit map 330. Bit values of bit locations are set to 1 when one or more items are hashed into their bit locations otherwise they are set to 0. An exemplary TriBiCa node also includes a next node bit map 340 which is the same size as the data bitmap within that node. For example, as illustrated in FIG. 3, the next node bit map 340 has 16 bit locations wherein their bit values are set according to the partitioning of the items 310 into a left child node or a right child node. Each bit location in the next node bitmap 340 corresponds to the same bit location in the data bitmap 330. Accordingly, the items hashed into bit location 1 and 4 as shown in the data bitmap 330 having corresponding next node bitmap values of 0 are sent to the left child node and the items hashed into bit location 6, 10, and 12 as shown in the data bitmap 330 having corresponding next node bitmap values of 1 are sent to the right child node. Note that each child node inherits half of the items 310 inserted/hashed into the node. The above process of inserting items into a node and partitioning takes place at every level and every node within a TriBiCa trie structure.

§4.2 Methods For Generating Exemplary Data Structure

§4.2.1 General Method

Figure 4:
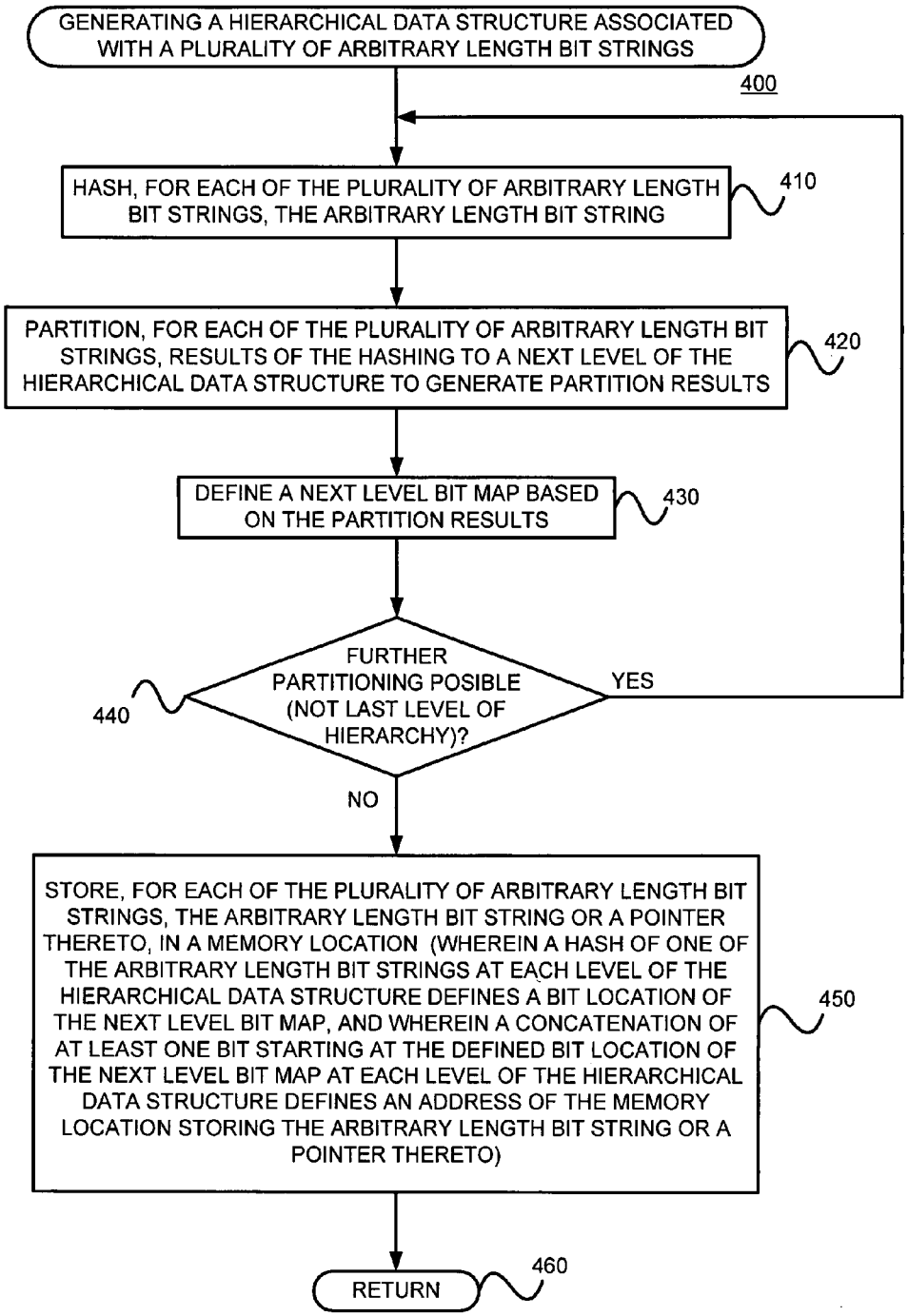
FIG. 4 is a flow diagram of an exemplary method which may be used to generate a hierarchical data structure associated with a plurality of arbitrary-length bit strings, in a manner consistent with the present invention.

FIG. 4 is a flow diagram of an exemplary method 400 which may be used to generate a hierarchical data structure associated with a plurality of arbitrary-length bit strings, in a manner consistent with the present invention. As shown, for each of the plurality of arbitrary-length bit strings, the arbitrary-length bit string is hashed. (Block 410) Further, for each of the plurality of arbitrary-length bit strings, results of the hashing are partitioned to a next level of the hierarchical data structure to generate partition results. (Block 420) A next level bit map is defined based on the partition results. (Block 430)

As indicated by conditional block 440, if the last level of the hierarchical data structure has not yet been generated (e.g., if further partitioning is possible), the method 400 branches back to block 410. Otherwise, if the last level of the hierarchical data structure has been generated (e.g., if further partitioning is not possible), the method 400 continues to block 450.

For each of the plurality of arbitrary-length bit strings, the arbitrary-length bit string (or a pointer to the arbitrary-length bit string) is stored in a memory location. (Block 400) The method 400 is then left. (Node 460)

Referring back to blocks 410 and 420, the hashing and partitioning are performed such that a hash of one of the arbitrary-length bit strings at each level of the hierarchical data structure defines a bit location of the next level bit map. Further, the hashing and partitioning are performed such that a concatenation of one or more bits starting at the defined bit location of the next level bit map at each level of the hierarchical data structure defines an address of the memory location storing the arbitrary-length bit string (or a pointer to the arbitrary-length bit string).

The hierarchical data structure generated by the method 400 of FIG. 4 may be a K-ary trie, where K is a whole number greater than or equal to 2. The hierarchical data structure provides a perfect hashing function. In at least some embodiments consistent with the present invention, K is an integer power of 2 (e.g., a binary trie). In such embodiments, the hierarchical data structure provides a minimal perfect hashing function.

Referring back to block 420, in some embodiments consistent with the present invention, the act of partitioning might use a greedy algorithm. An exemplary greedy algorithm is described in detail, in §4.2.2.1.2 below. In some embodiments consistent with the present invention, the act of partitioning might use a so-called "blackjack" algorithm. An exemplary blackjack algorithm is described in detail, in §4.2.2.1.1 below. Some embodiments consistent with the present invention might use both a greedy algorithm and a blackjack algorithm for partitioning. In such embodiments, one or more higher levels of the hierarchical data structure may be partitioned using a blackjack algorithm, while one or more lower levels of the hierarchical data structure may be partitioned using a greedy algorithm.

A data structure generated by the exemplary method 400 of FIG. 4 may be used to determine quickly whether an arbitrary-length bit string matches (or might match) one of a large number of known arbitrary-length bit strings. This characteristic makes such a data structure useful, for example, in communications network security. Specifically, this characteristic makes such a data structure useful to determine whether an input arbitrary-length bit string matches one of a number of known network intrusion signatures quickly. As another example, this characteristic also makes such a data structure useful to determine whether an input arbitrary-length bit string matches one of a number of known nucleotide sequences, such as known DNA and/or RNA sequences.

Details of exemplary embodiments for performing the method 400 of FIG. 4 in a manner consistent with the present invention are described in §4.2.2 below.

As can be appreciated from the foregoing, the method 400 of FIG. 4 may be used to produce computer-readable data structures stored on a computer-readable storage. The data structures may include an addressable memory and a hierarchical data structure. Specifically, the memory may store, for each of a plurality of known arbitrary-length bit strings, the known arbitrary-length bit string (or a pointer to the known arbitrary-length bit string) in an addressed location. Regarding the hierarchical data structure, a hash of one of the plurality of known arbitrary-length bit strings at each level of the hierarchical data structure may define a bit location of a data bit map and a next level bit map, such that a hash of one of the arbitrary-length bit strings at each level of the hierarchical data structure defines a bit location of the next level bit map, and such that a concatenation of one or more bits starting at the defined bit location of the next level bit map at each level of the hierarchical data structure defines an address of the memory location storing the arbitrary-length bit string (or a pointer to the arbitrary-length bit string).

§4.2.2 Other Exemplary Methods

Figure 5:
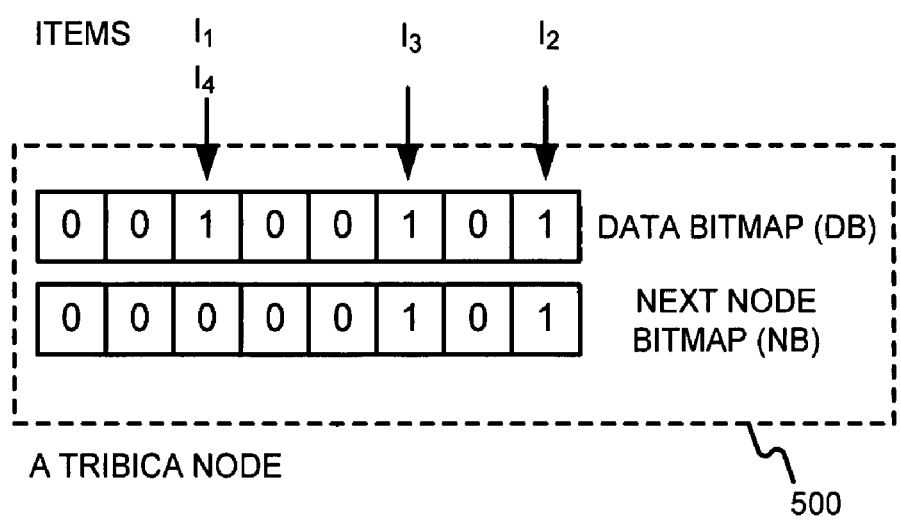
FIG. 5 illustrates another exemplary TriBiCa node consistent with the present invention.

FIG. 5 illustrates another exemplary TriBiCa node. As discussed earlier, each node consists of a data bitmap (DB) and a next node bitmap (NB). The DB indicates whether a given item is stored in this node. If this item is stored in this node, then the NB shows the child node inheriting this item. Both bitmaps have equal sizes and are addressed with a single universal hash function. We call each NB/DB bit pair in a node a bin. All nodes at the same level have equal bitmap sizes and are addressed with the same hash function. To insert an item into a node, we simply hash the item with this hash function, and set the bit corresponding to the hash result in the DB. The corresponding NB bit will show which child (left=0 or right=1) node inherits this particular item.

Figure 6:
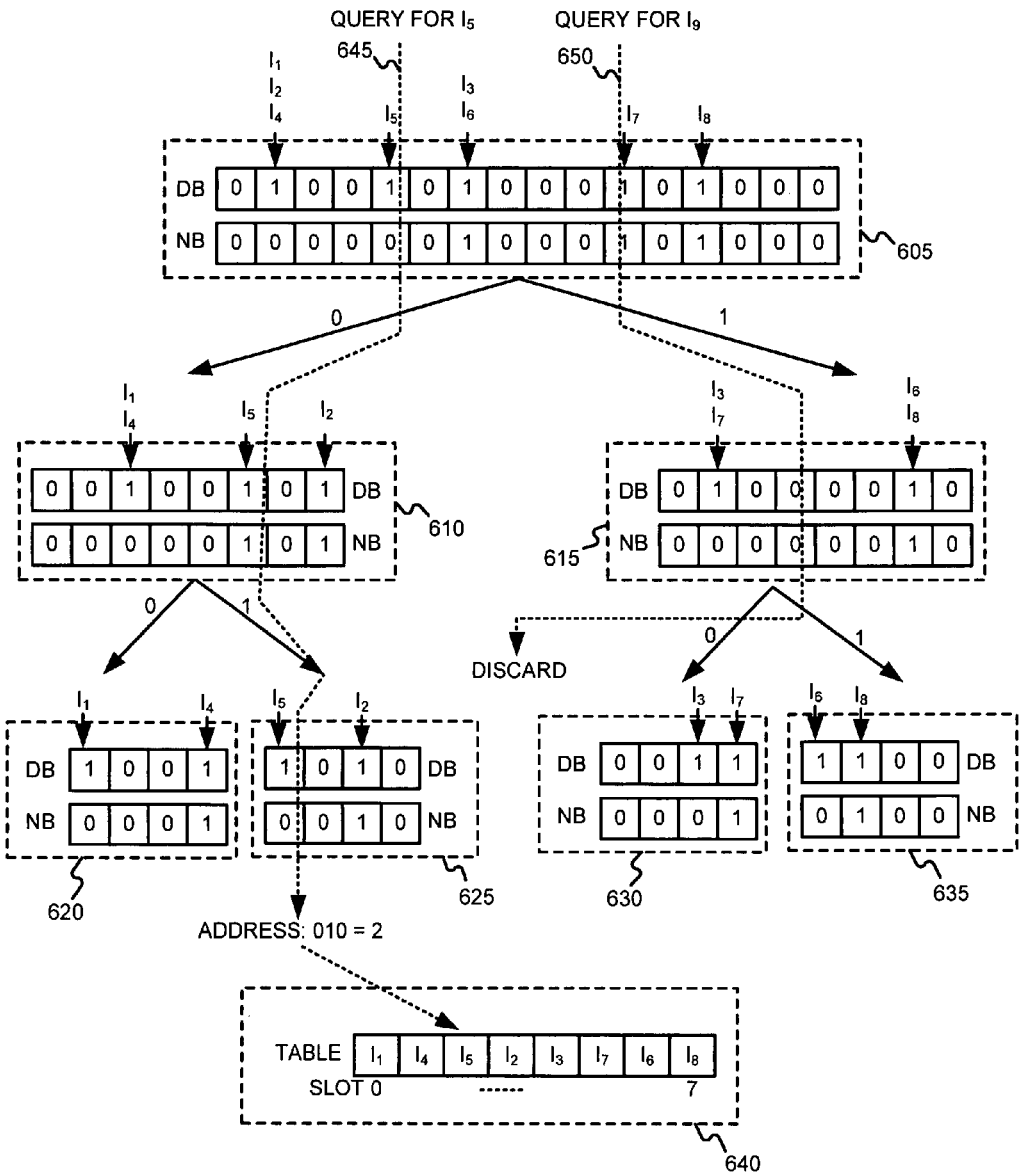
FIG. 6 illustrates an exemplary querying mechanism of an exemplary TriBiCa trie structure, consistent with the present invention.

Given the data structure discussed earlier as well as the structure of an exemplary TriBiCa node, an exemplary TriBiCa data structure and examples of querying are introduced. FIG. 6 illustrates an exemplary TriBiCa trie with 3 levels and 8 items ($I_1$-$I_8$). These items are first hashed to the root node. Half of the items in the root node ($I_1$, $I_2$, $I_4$ and $I_5$) are inherited by the left child (NB=0), and the rest by the right child (NB=1). The same operation is repeated in the child nodes (e.g., $I_5$ first goes to right (NB=1) and then to the left (NB=0)). The path traversed is encoded by the NB values and determines the address of the item in the table. The partitioning algorithm determines the content of NB. All items hashed to the same bin in a node share the same next node information since they share the same NB bit. So, items hashed to the same bin in a node go to the same child node. This constraint is referred to as the collision constraint, and any partitioning algorithm should follow this constraint.

When n is not an integer power of two, the binary trie will not be balanced and the partitioning will be left-aligned, i.e., nodes at level l will be filled from left to right with $2^{\lceil \log_2(n) \rceil - l}$ items as long as there are enough items left. The remainder of the items will be put into the next node and the rest of the nodes (and their children) will be removed. Optionally, TriBiCa can be designed as a k-ary trie instead of a binary trie, where each node has k children (k may differ between levels). This option is discussed in §4.5 below.

In the following paragraphs, the set-membership query mechanism provided by TriBiCa, which has similarities with Bloom Filters ("BF") (B. Bloom, "Space/time trade-offs in hash coding with allowable errors," *Communications of the ACM*, vol. 13, no. 7, 1970.), is illustrated. As with BFs, TriBiCa allows low-cost set-membership queries through bitmaps. However TriBiCa bitmaps are embedded in a trie structure. Additionally, TriBiCa provides member identification with a response to a matched query, a feature that BFs do not provide.

Once all items from an item set S are hashed into TriBiCa, TriBiCa is ready for membership queries. The input is first hashed to the DB of the root node. If the corresponding bit value is zero, then this query item is not a member and it is discarded immediately, without further processing. On the other hand, if the bit is set to one, this query item may be a member of the item set S. The corresponding bit in the NB will show the child to which to branch. The trie is then traversed until any node gives a no match (at least one node DB returns a zero) or the leaf node is reached. If at any node, the DB yields a zero, TriBiCa discards the input, allowing sub-linear processing time on average. Otherwise, if the input is hashed at all levels only to the bins with DB=1, the NB values on the path will be used as an address to the table/memory to retrieve the item. Then the input will be compared with this item for final membership decision, guaranteeing, at most, one string matching operation per input. A non-member input may cause a false positive, rendering one unnecessary string matching operation that resolves the false positive. These false positives determine the average performance but do not impact the worst case (i.e., the worst case is one string matching operation per query).

§4.2.2.1 Partitioning

As noted in sections §4.1 and §4.2.2, if TriBiCa is to achieve minimal perfect hashing, a partitioning algorithm that guarantees a non-conflicting partitioning is required. Such partitioning algorithms are discussed in this section. For offline partitioning algorithms described here, an auxiliary data structure for each node called an occupancy map is used. The occupancy map holds the occupancies for each bin (i.e., the number of items hashed to that bin) in the node along with the list of items hashed to that bin. Such a map for the example node given in FIG. 5 is shown in FIG. 7. This map is not needed for online operation (i.e., on-chip operation).

Following the collision constraint, partitioning the items in a node with n items into two equal-sized groups, is simply partitioning the occupancy values of that node into two partitions with equal sums. In other words, let q be the number of bins with occupancies larger than 0 in a node and let Q be the set of these occupancy values. Then, finding two such disjoint subsets of Q each with sum c=n/2 is the same problem as partitioning the items in a node into two equal-sized groups under the collision constraint. It is worth noting that, if the trie is not balanced, then the sums at the remainder nodes will not be equal. If a TriBiCa is designed as a k-ary trie, the occupancy values should be partitioned into k partitions each with equal sums of n/k.

In (B. Hayes, "The easiest hard problem," *American Scientist*, vol. 90, no. March-April, pp. 113-117, 2002.), Hayes argued that the best predictor of difficulty in the number partitioning problem is $$\psi = \omega/n \quad (1)$$

where ω is the number of bits required to represent the largest number in the set (i.e., ω=log M and M is the maximum occupancy value among bins of a given node for the purpose of the discussion). The maximum value in the occupancy map (that is the occupancy of the bin with maximum items) is low even for a load factor of ρ=n/μ=1, where μ is the size of each bitmap (NB or DB) for this node. It can be shown that the expected maximum occupancy for a load factor of 1 is (T. Cormen, C. Leiserson, and R. Rivest, *Introduction to Algorithms*. The MIT Press, 2001.), $$E[M] = O(\log n / \log(\log n)) \quad (2).$$

From the two equations above, the difficulty of the partitioning problem instance decreases with n, since the expected value of M is sub-linear in n. As a result, for the high levels of the trie (i.e., levels close to the root where n is larger), the problem is simpler, whereas it gets harder as the leaf nodes are approached. Intuitively, it is easier to find a subset with a desired sum selected out of many small numbers (high-level nodes), rather than finding it among a few large numbers (low-level nodes). So, for high-level nodes, a naïve algorithm is likely to find a solution, since it is likely that there are many solutions available. As the leaf nodes are approached, however, this is unlikely since there will be fewer solutions, if any at all. On the other hand, using a brute-force algorithm that is basically trying all possible subsets of Q to find if there is any possible equal partitioning is feasible at low levels. There are a total of s=$2^q$ subsets for a given occupancy map and q cannot be larger than the sum of occupancies (i.e., n), so s is bounded with $2^n$. This bound, however, is not tight. Among these subsets only the subsets with a sum of n/2 is of interest for the purpose of equal partitioning. For instance, if a subset $s_i$ has a sum larger than n/2, the brute-force algorithm will take into consideration any of $s_i$'s supersets. Also, it can easily be observed that for a given n, as the number of collisions in the hash table increases, the number of subsets of Q decreases. So, if there are a few hash collisions, a brute force algorithm is expected to reach an equal partitioning fast, since the number of subsets with sum n/2 is large. On the other hand, if there are many hash collisions, there are a few subsets so the algorithm covers all subsets faster, although with a lower probability of finding an equal partitioning. Next, an equal partitioning technique is discussed suitable for high nodes (a blackjack technique) and another for low nodes (a greedy technique).

§4.2.2.1.1 Partitioning Using a Blackjack Technique

The naïve algorithm proposed here to partition high levels—The Blackjack Technique—is a straightforward algorithm relying on the fact that for nodes with many items (i.e., large n), the probability of failing to find an equal partitioning is slim. Besides, in most cases there are too many possible solutions. On the other hand, for nodes with such large n, the brute-force approach is not practical. For each node to be partitioned, starting from the leftmost bin among the occupied bins (i.e., any bin, where DB value is 1) and proceeding to the right, the items in each bin are added to the left partition unless adding the next bin causes the size of the left partition to go over n/2 (thus the name, "Blackjack"). If adding the items hashed to the bin causes the size of the left partition to go over n/2, this bin is skipped (i.e., added to the right partition) and the following bin is tried until a perfect size of n/2 is reached or all bins are tried. If the perfect size is reached, the remaining items will be put into the right partition and the partitioning is completed. Otherwise, the algorithm restarts from the second occupied bin on the left and retries. If all starting points are exhausted, either of the following two options can be selected. First, for the nodes that failed to partition, their parent nodes are tried to be partitioned again with a different starting point to allow new options for the failed node. Second, a new hash function can be issued for the level, and partitioning of this level restarts again. This algorithm can be extended to a k-ary trie node by repeating the same operation for k−1 times for each partition except the last and with a target sum of n/k.

Figure 8:
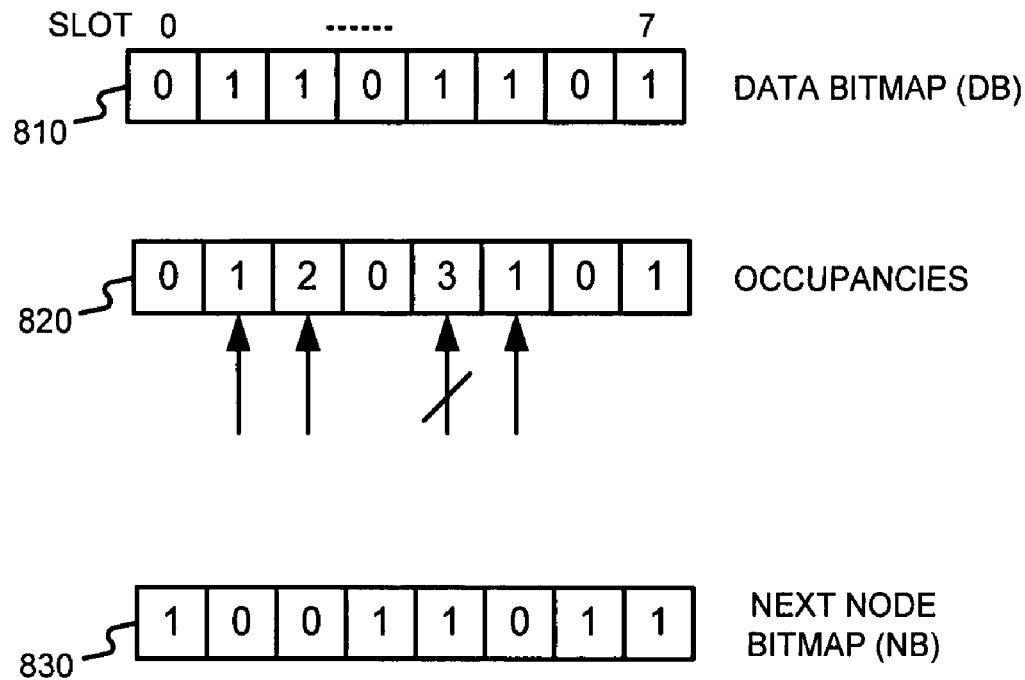
FIG. 8, illustrates the application of the blackjack algorithm at a TriBiCa node comprising a data bitmap, its corresponding occupancy map, and the next node bitmap, in a manner consistent with the present invention.

FIG. 8 illustrates the application of a blackjack technique at a TriBiCa node comprising a data bitmap its corresponding occupancy map and the next node bitmap. In FIG. 8, there is a total of 8 items in the node that need to be partitioned. As discussed above, the Blackjack technique starts adding the occupancy values of occupied bins from left to right. The bins added are marked by solid arrows. Therefore, the Blackjack technique starts adding the occupancies beginning at bin 1. The addition of the occupancies at bin 4 causes the size of the left portion to go over 4. Thus, bin 4 is skipped. As a result, the addition of occupancies at bin 1, bin 2 and bin 5 results is the summation of 4 items. Therefore, the next node bitmap values at those bins (i.e., bins 1, 2, and 5) will be set to 0 indicating their grouping to the left child node and the remaining next node bitmap values of the remaining occupied bins (i.e., bins 4, and 7) are set to 1 indicating their grouping to the right child node.

§4.2.2.1.2 Partitioning Using a Greedy Technique

For the low levels of TriBiCa, the solutions are not as abundant as for the high levels. It is specifically critical at the last level, where in order to reach perfect hashing, there should not be any collisions in any node at all. The greedy technique may achieve perfect hashing by trying all possible solutions over the few low levels. As more levels are included in the search (i.e., more levels are designated as low levels), the probability of reaching a perfect hashing increases as demonstrated in §4.5. However, as more levels are included, the solution space increases substantially. Thus, running time may increase unacceptably. For the application of the NIDPS for Snort signature database and the possible expansion of this database in the future, designating the last 4 levels (levels with 16 or fewer items in their most crowded node) as low-level nodes is a suitable selection for the given size of the problem as discussed in §4.5.

To simply the discussion, a super node is defined as a sub-trie that is rooted from any node of the first level of low-level nodes and has last level nodes as its leaf nodes. The greedy technique works on each super node independently. It starts by partitioning the root node of a super node. To do this partitioning, the greedy technique goes through all subsets of the set of occupancy values (i.e., subsets of Q) to find a subset with sum n/2. The items in this subset are inherited by the left child. The remaining items are inherited by the right child. The greedy technique then partitions the child nodes recursively in the same way as it partitions the root node until all nodes are partitioned successfully. If all the leaf nodes are free from collisions, the processing of this super node is completed successfully. If at some level, all the possible partitionings failed, the algorithm goes back one level up and finds the next valid configuration at that level and resumes recursive behavior.

Note that the partitioning should be successful for all the sub-tries rooted from the highest low-level to reach the goal of finding a minimal perfect hashing for the entire input set S. If any sub-trie exhausts all partitionings without any success, either the parent high level nodes are partitioned again to allow new options for the failed nodes, or a new hash function set will be issued for the low levels and the partitioning of low levels restarts from scratch. It can also be very effective to use a few additional hash sets for the failed super nodes as detailed in §4.5.

§4.2.3 Example of Operations of a Method for Generating An Exemplary Data Structure FIG. 6 illustrates an exemplary TriBiCa trie with 3 levels and 8 items ($I_1$-$I_8$). In FIG. 6, the query for $I_5$ depicted by a dotted line 645 running along each level, which is in TriBiCa, gives matches in all nodes (i.e., nodes 605, 610, and 625) it is queried. Specifically, following the dotted line 645, the query for $I_5$ at each level of the trie gives all DB values of 1. The corresponding NB values through the path (i.e., nodes 605, 610, and 625), 010, encodes the location of the query item in the table/memory 640. To complete the matching, the item is fetched from the table/memory 640 and compared with the query. Finally, the query for $I_9$ depicted by a dotted line 650 running long the trie levels, which is a non-member item, gives a match at level 0 but fails to provide a match at level 1 (i.e., match at node 605, no match at node 615). Specifically, the DB bit value where item $I_9$ is hashed at level 1 is zero. Therefore, TriBiCa discards the input. If this were a false positive, the query would not be discarded and would reach the final level. The final comparison with the item in the table/memory 640 would then determine that this item is not a member. If the average performance is not critical, then data bitmaps can be removed from TriBiCa nodes, reducing the memory to half without affecting the worst case.

§4.3 Methods For Intrusion Detection Using Exemplary Data Structures

§4.3.1 General Methods

Figure 9:
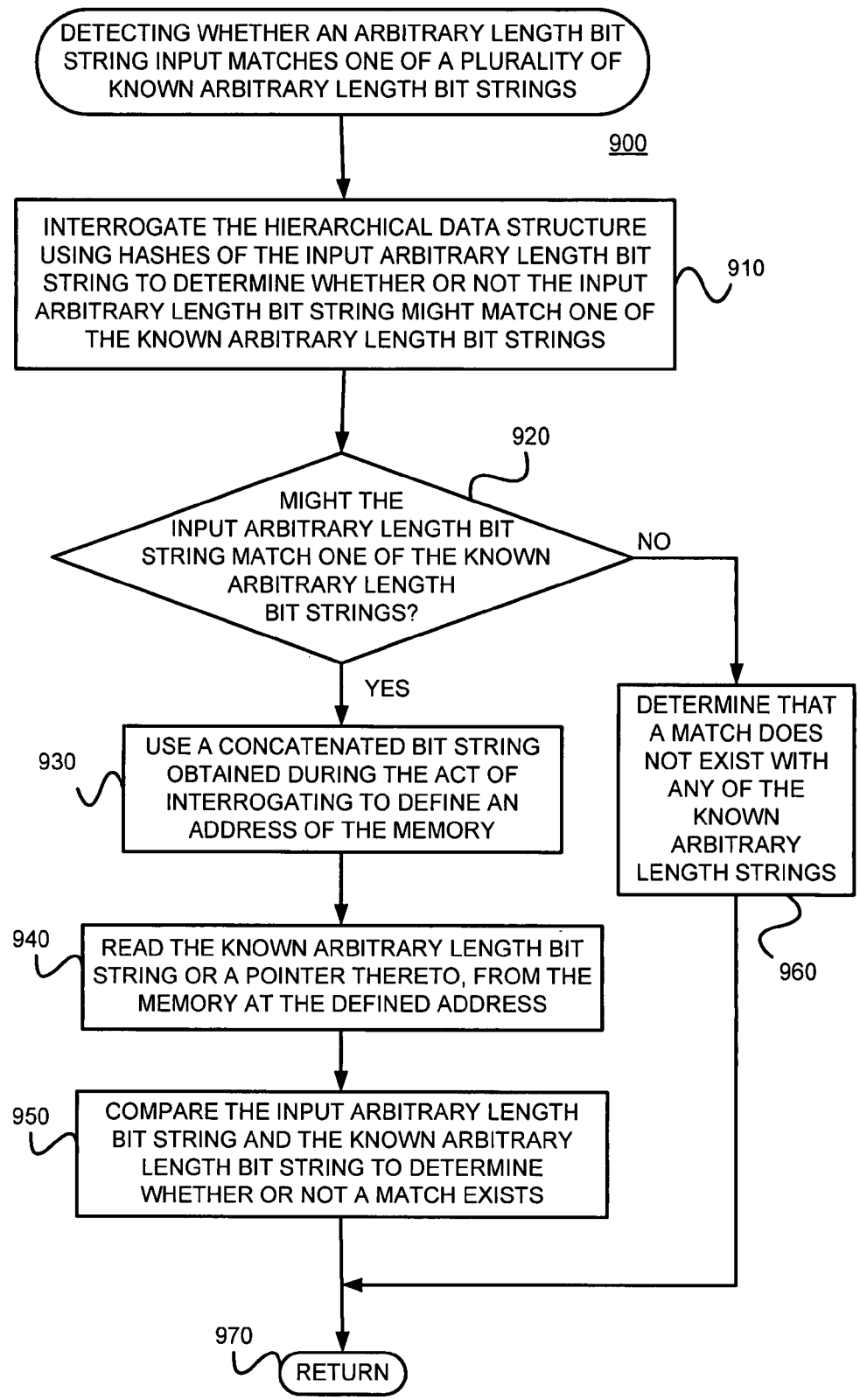
FIG. 9, is a flow diagram of an exemplary method for detecting whether an arbitrary-length bit string input matches one of a plurality of known arbitrary-length bit strings in a manner consistent with the present invention.

FIG. 9 is a flow diagram of an exemplary method 900 for detecting whether an arbitrary-length bit string input matches one of a plurality of known arbitrary-length bit strings in a manner consistent with the present invention. The method 900 may use a memory storing, for each of the plurality of known arbitrary-length bit strings, the known arbitrary-length bit string (or a pointer to the known arbitrary-length bit string), in an addressed location. The method 900 may also use a hierarchical data structure, wherein a hash of one of the plurality of known arbitrary-length bit strings at each level of the hierarchical data structure defines a bit location of a data bit map and a next level bit map.

The exemplary method 900 interrogates the hierarchical data structure using hashes of the input arbitrary-length bit string to determine whether or not the input arbitrary-length bit string might match one of the known arbitrary-length bit strings. (Block 910)

Referring to conditional block 920, if it was determined that the input arbitrary-length bit string might match one of the known arbitrary-length bit strings, then the method 900 continues to block 930. In such a case, a concatenated bit string obtained during the act of interrogating is used to define an address of the memory. (Block 930) Then, the known arbitrary-length bit string is read from the memory at the defined address (or a pointer to the known arbitrary-length bit string is read from the memory at the defined address and used to get the known-arbitrary length bit string). (Block 940) Finally, the input arbitrary-length bit string and the known arbitrary-length bit string are compared to determine whether or not a match exists. (Block 950) The method 900 is then left. (Node 970)

Referring back to conditional block 920, if it was not determined that the input arbitrary-length bit string might match one of the known arbitrary-length bit strings (i.e., if it was determined that no match exists), then the method 900 continues to block 960. In this case, the method 900 determines that a match does not exist with any of the known arbitrary-length strings (Block 960) before the method 900 is left (Node 970).

The hierarchical data structure used by the method 900 of FIG. 9 may be a K-ary trie, where K is a whole number greater than or equal to 2. The hierarchical data structure provides a perfect hashing function. In at least some embodiments consistent with the present invention, K is an integer power of 2 (e.g., a binary trie). In such embodiments, the hierarchical data structure provides a minimal perfect hashing function.

The method 900 of FIG. 9 may be used to determine quickly whether an arbitrary-length bit string matches (or might match) one of a large number of known arbitrary-length bit strings. This characteristic makes such a method useful, for example, in communications network security. Specifically, the method 900 may be used to determine whether an input arbitrary-length bit string matches one of a number of known network intrusion signatures. As another example, the method 900 may be used to determine whether an input arbitrary-length bit string matches one of a number of known nucleotide sequences, such as known DNA and/or RNA sequences.

Details of exemplary embodiments for performing the method 900 of FIG. 9 in a manner consistent with the present invention are described in §4.3.2 below.

Figure 10:
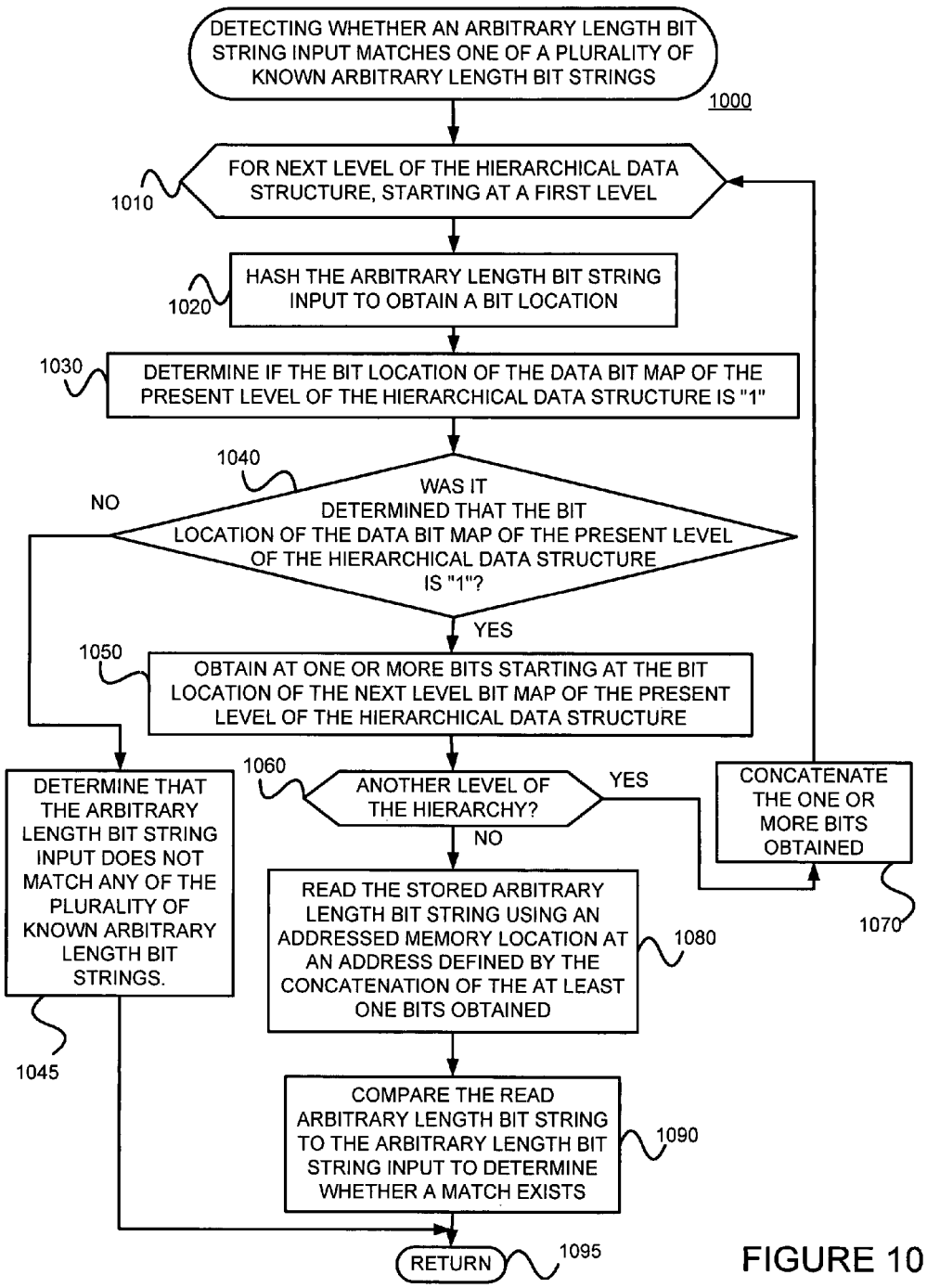
FIG. 10 is a flow diagram of an exemplary method for detecting whether an arbitrary-length bit string input matches one of a plurality of known arbitrary-length bit strings in a manner consistent with the present invention.

Like the method 900 of FIG. 9, FIG. 10 is a flow diagram of an exemplary method 1000 for detecting whether an arbitrary-length bit string input matches one of a plurality of known arbitrary-length bit strings in a manner consistent with the present invention. The method 1000 may use a memory storing, for each of the plurality of known arbitrary-length bit strings, the known arbitrary-length bit string (or a pointer to the known arbitrary-length bit string), in an addressed location. The method 1000 may also use a hierarchical data structure, wherein a hash of one of the plurality of known arbitrary-length bit strings at each level of the hierarchical data structure defines a bit location of a data bit map and a next level bit map.

The exemplary method 1000 may interrogate one or more layers of the hierarchical data structure as indicated by loop 1010-1060. Specifically, a number of acts are performed for one or more layers of the hierarchical data structure, starting at a first level of the hierarchical data structure. (Block 1010) Specifically, the arbitrary-length bit string input may be hashed to obtain a bit location (Block 1020), and it is determined if the bit location of the data bit map of the present level of the hierarchical data structure is "1" (Block 1030). Referring to conditional block 1040, if it was determined that the bit location of the data bit map of the present level of the hierarchical data structure is not "1", then the loop 1010-1060 is escaped and it is determined that the arbitrary-length bit string input does not match any of the plurality of known arbitrary length bit strings (Block 1045) before the method 1000 is left (Node 1095). Note that under this condition, the input arbitrary-length bit string might not be hashed and checked against all levels of the hierarchical data structure.

Referring again to conditional block 1040, if it was determined that the bit location of the data bit map of the present level of the hierarchical data structure is not "1", then the method 1000 continues to block 1050. Specifically, one or more bits, starting at the bit location of the next level bit map of the present level of the hierarchical data structure, is obtained. (Block 1050)

It is then determined whether the there is another level of the hierarchical data structure (i.e., present level of the hierarchical data structure is not the last level). (Block 1060) If so, the one or more bits obtained are concatenated with a (concatenation of) previously obtained one or more bits (if any) (Block 1070), and the method 1000 branches back to block 1010 to process the next level of the hierarchical data structure.

Referring again to block 1060, if it is determined that there is not another level of the hierarchical data structure (i.e., present level of the hierarchical data structure is the last level), then the method 1000 continues to block 1080. At block 1080 the stored arbitrary-length bit string is read using an addressed memory location at an address defined by the concatenation of the one or more bits obtained. (Block 1080) Then, the read arbitrary-length bit string is compared to the arbitrary-length bit string input to determine whether a match exists (Block 1090) before the method 1000 is left (Node 1095).

The hierarchical data structure used by the method 1000 of FIG. 10 may be a K-ary trie, where K is a whole number greater than or equal to 2. The hierarchical data structure provides a perfect hashing function. In at least some embodiments consistent with the present invention, K is an integer power of 2 (e.g., a binary trie). In such embodiments, the hierarchical data structure provides a minimal perfect hashing function. Referring back to block 1050, the number of bits obtained may be a function of the trie structure. For example, in a binary trie, where each node has two (2) child nodes at a next hierarchical level, only one (1) bit need be obtained, since one (1) bit can be used to identify either of the two (2) child nodes. For a K-ary trie where K is three (3) or four (4), only two (2) bits need be obtained, since two (2) bits can be used to identify any one of three (3) or four (4) child nodes. For a K-ary trie where K is from five (5) to eight (8), only three (3) bits need be obtained, since three (3) bits can be used to identify any one of five (5) to eight (8) child nodes, and so on.

The method 1000 of FIG. 10 may be used to determine quickly whether an arbitrary-length bit string matches (or might match) one of a large number of known arbitrary-length bit strings. This characteristic makes such a method useful, for example, in communications network security. Specifically, the method 1000 may be used to determine whether an input arbitrary-length bit string matches one of a number of known network intrusion signatures quickly. As another example, the method may be used 1000 to determine whether an input arbitrary-length bit string matches one of a number of known nucleotide sequences, such as known DNA and/or RNA sequences.

§4.3.2 Using Chunking to Detect Long Bitstream Matches

In this section, an efficient string matching model that achieves deterministic time matching using input independent state machines is presented. Then, it is shown that the NIDPS architecture based on TriBiCa following this model achieves deterministic throughput. The model, similar to (F. Yu, T. Lakshman, and R. Katz, "Gigabit rate pattern-matching using tcam," in *Int. Conf. on Network Protocols (ICNP)*, Berlin, Germany, October 2004.) and (S. Dharmapurikar and J. Lockwood, "Fast and scalable pattern matching for content filtering," in *Symposium on Architectures for Networking and Communications Systems (ANCS)*, October 2005.), emulates the behavior of the Aho-Corasick state machine, using a memory and a small fixed state machine. This way, the model can detect arbitrary length signatures, avoiding scalability issues for long signatures. As in previous work (F. Yu, T. Lakshman, and R. Katz, "Gigabit rate pattern-matching using tcam," in *Int. Conf on Network Protocols (ICNP)*, Berlin, Germany, October 2004.), (S. Dharmapurikar and J. Lockwood, "Fast and scalable pattern matching for content filtering," in *Symposium on Architectures for Networking and Communications Systems (ANCS)*, October 2005.), each signature is chopped into c-byte fixed size chunks. If a signature's length l is not a multiple of c, then the last l mod c bytes of this signature will be identified by a separate detector. Specifically, all signatures with length i, where i mod c≠0 will share a detector to detect their final suffixes. For this purpose, (c−1) detectors are needed.

To carry multiple-string matching over an input stream in deterministic time, the following conditions should be satisfied. First, the string matching system should be able to detect the starting point of a signature in the payload, even when another match is in progress. Second, it should be able to follow a long signature until it is complete. Third, in case of a failure on detecting a long signature, the DPI system should be able to continue with the longest prefix detected (i.e., the prefix that ends in the last detected chunk). Finally, if a signature contains another signature, the contained signature should be reported whether the large signature is detected or not.

Figure 11:
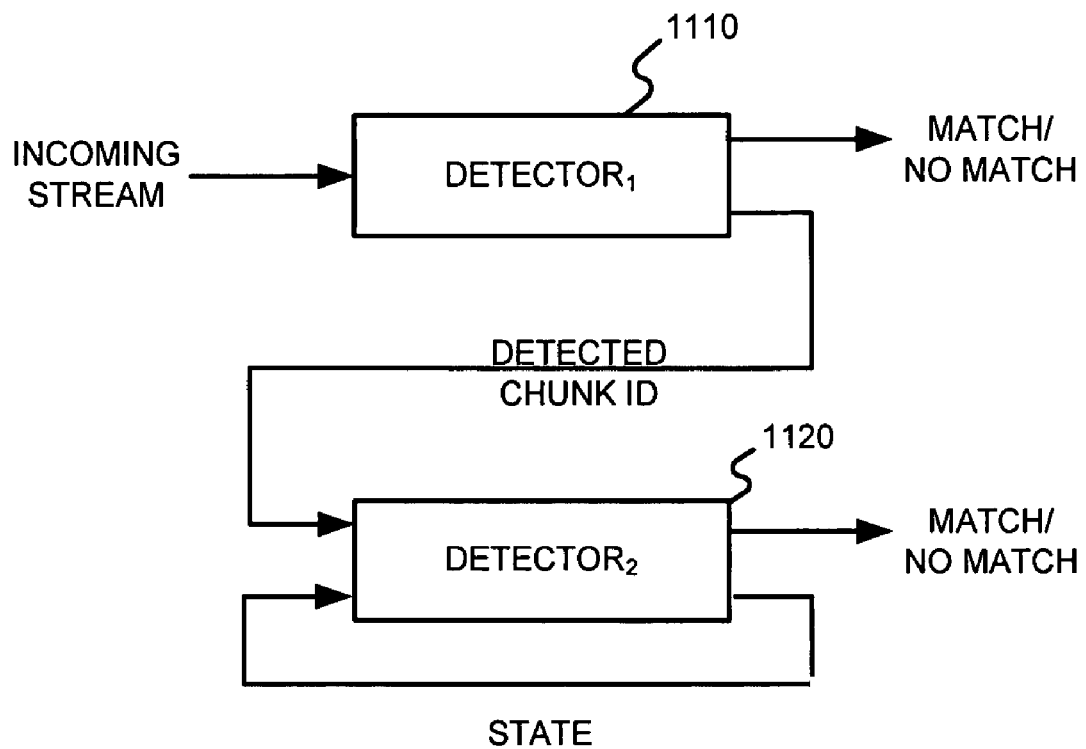
FIG. 11 is a deterministic time string-matching model that may be used with a TriBiCa structure in a manner consistent with the present invention.

To satisfy the four conditions above, thus achieving deterministic detection time of any input for signatures with length $l_c$, such that $l_c$ mod c=0, the two detectors shown in FIG. 11 that work on c-byte chunks of the input are sufficient.

In FIG. 11, detector$_1$ 1110 is responsible for detecting c byte chunks on a sliding window input. In case of a match, detector$_1$ 1110 reports a unique ID of the detected chunk to detector$_2$ 1120. If this chunk is actually a complete c-byte signature, a signature found alert is also issued. Also, detector$_2$ 1120 is responsible for detecting larger signatures in a stateful manner. Receiving two matches, c-byte apart from detector$_1$ 1110, detector$_2$ 1120 looks for $ID_1$, $ID_2$ to match (a prefix of) a long signature consisting of chunk$_1$ and chunk$_2$. If there is a match, $ID_1$ is replaced with the match $ID_{1-2}$ (representing the state "$ID_1$ followed by $ID_2$"). Next $ID_{r-2}$ and $ID_3$ are queried in detector$_2$ 1120. If on the other hand, $ID_1$, $ID_2$ fails to match in detector$_2$ 1120, detector$_2$ 1120 continues with input $ID_2$, $ID_3$ to detect a possible new signature that starts with $ID_2$. This way, the beginning of the second signature is detected even when there is an ongoing match without any time penalty (satisfying conditions 1 and 4 above).

To follow signatures whose 2 c-byte or longer prefixes are a factor or a suffix of other signatures, one state is added as in (F. Yu, T. Lakshman, and R. Katz, "Gigabit rate pattern-matching using tcam," in *Int. Conf. on Network Protocols (ICNP)*, Berlin, Germany, October 2004.). For instance, let (1) ABCD and (2) BCEF be two signatures, where each character resembles a c-chunk byte. Then, an input string such as ABCEF will miss signature (2). However, if we add another state showing transition from ABC to CE, then this will detect the second signature successfully. To be more specific, the new state should be added starting from the first location where signature (1) differs from signature (2) and points to the corresponding location in signature (2) (satisfying condition 3).

Note that for a sliding window input, c different stateful detections can be in progress for all c offsets, concurrently (between 0 and c−1). However, as pointed out in (S. Dharmapurikar and J. Lockwood, "Fast and scalable pattern matching for content filtering," in *Symposium on Architectures for Networking and Communications Systems (ANCS)*, October 2005.), by storing the state for each offset individually, this concurrent requirement can be satisfied.

There are signatures with lengths not multiples of c (i.e., signatures with length R=a·c+r, where a>0 is an integer.). To detect these signatures, a similar two stage approach is used for each r<c. The first stage (detector$_{r1}$) is responsible for detecting the r<c byte signatures and r<c byte suffixes. The second stage (detector$_{r2}$) detects signatures with length R bytes. The a·c byte prefix is detected by detector$_2$ above resulting in a state of $S_{cur}$. Then detector$_{r2}$ makes one query with $S_{cur}$, $ID_r$, where $ID_r$ is the ID of the r-byte suffix detected by detector$_{r1}$.

Based on this model, an NMDPS is designed using TriBiCa. TriBiCa along with an SSM (Single-String-Matching) Circuit is used to detect (S, chunk) type of queries for each stage in FIG. 12. For the first stage, a TriBiCa that holds all c-byte chunks is used (TriBiCa$_1$) 1220. TriBiCa$_1$ 1220 is queried with each c-byte chunk of the incoming traffic. If it gives a match, it points to a single location in the corresponding signature table (not shown in the figure). The SSM$_1$ 1230 circuit then reads this signature and compares it with the input. If there is a match, the address of this signature is passed to the second stage as ID. The second TriBiCa 1240 works on ID pairs. All ID pairs involved in signatures are put into the second TriBiCa 1240. The operation is similar to the first TriBiCa 1220, other than the input type. If there is a match on SSM$_2$ 1250, this output is fed back to the second TriBiCa 1240 as the new ID. For signatures with length r<c and for suffixes shorter than c-bytes, additional TriBiCas are used in a similar way. Note that, for certain cases (such as 1-byte signatures), trivial data structures (such as a bitmap showing matched characters) can be used (N. S. Artan and H. J. Chao, "Design and analysis of a multi-packet signature detection system," to appear in *Int. J. Security and Networks.*).

§4.3.2.1 Example of Detection Operations

Figure 12:
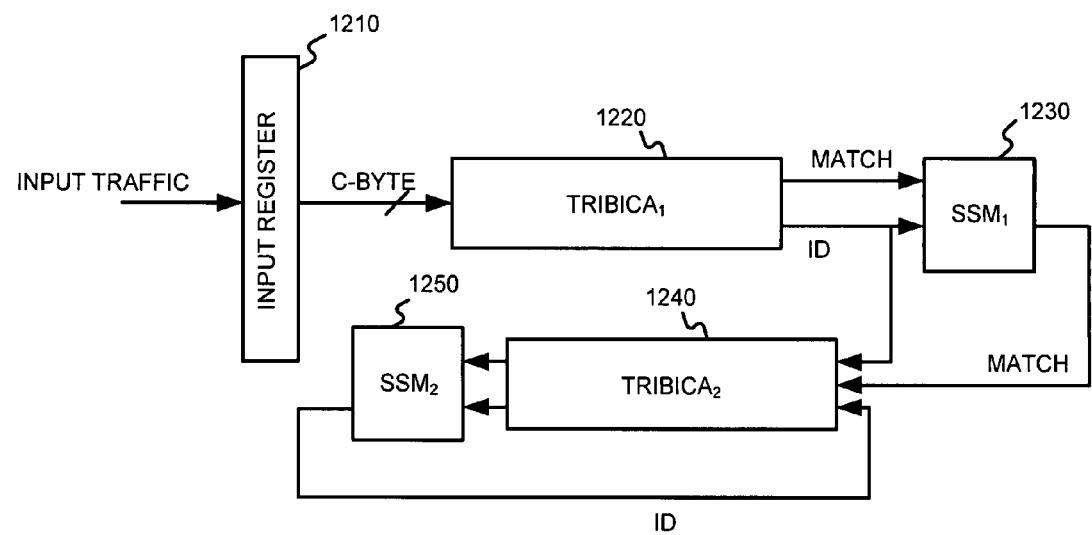
FIG. 12 is an exemplary network intrusion detection and prevention system using TriBiCa detectors and single-string-matching circuits, consistent with the present invention.
Figure 13:
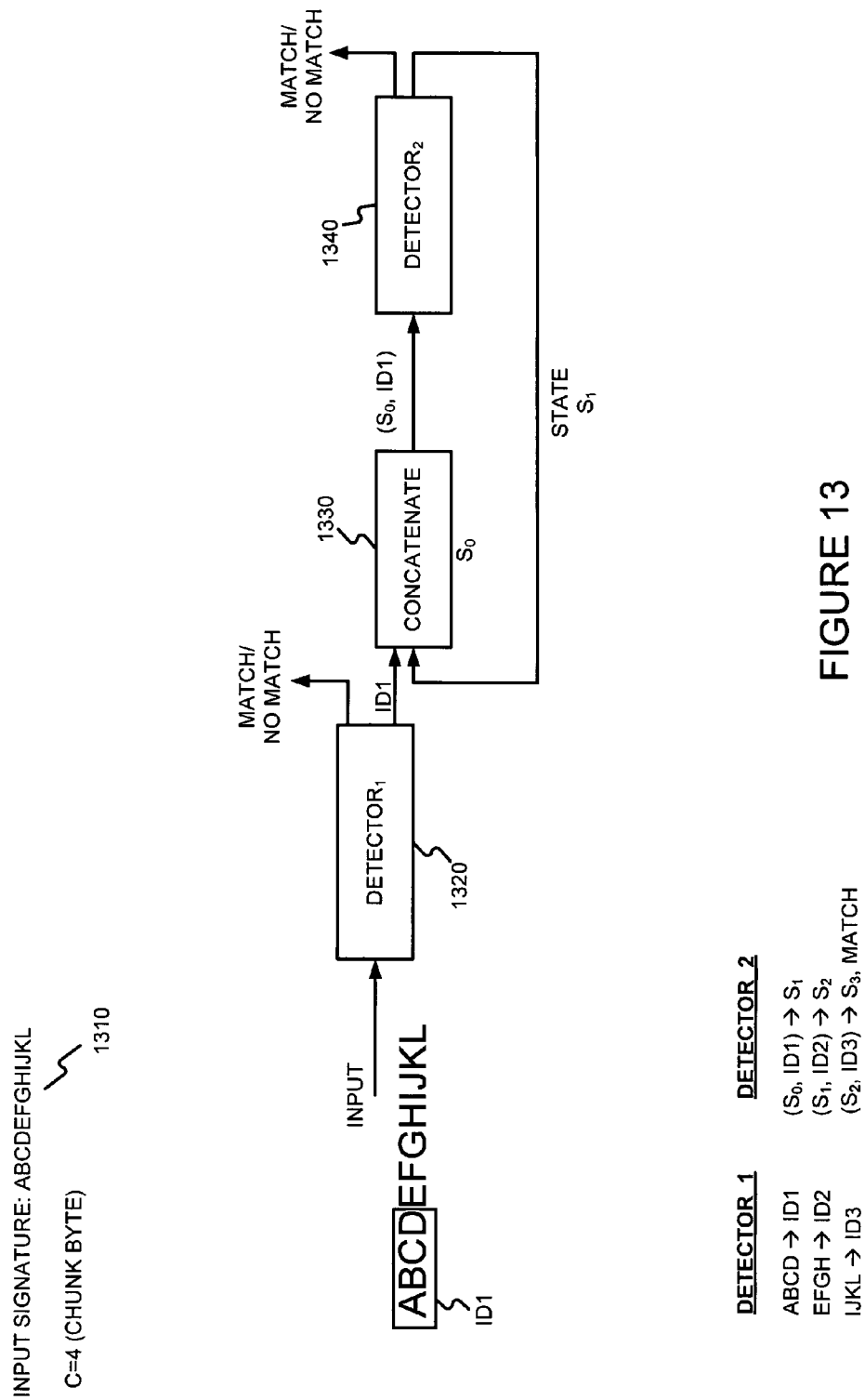
FIG. 13 illustrates a deterministic time string matching model using TriBiCa detectors for detecting long signatures in a manner consistent with the present invention.

FIG. 13 illustrates a deterministic time string matching model used by TriBiCa for detecting long signatures. In particular, given the signature ABCDEFGHIJKL 1310, the TriBiCa system first chops the signature into 4 chunk bytes wherein each chunk is given an ID. Detector, 1320 can be thought of as a TriBiCa trie structure wherein it may detects all three 4 chunk bytes (i.e., ID1, ID2, and ID3 as shown in FIG. 13) of the signature 1310. Detector$_2$ 1340 can be thought of as a TriBiCa trie structure wherein it may detect all three state representation of the signature 1310 (i.e., $S_1$, $S_2$, and $S_3$ as shown in FIG. 13). The successful and successive matching of IDs and states S of the input signature by the detectors 1320 and 1340 according to the model illustrated in FIG. 13 results is an efficient string-matching model that can be used in a NIDPS architecture based on TriBiCa. In a TriBiCa based NIDPS architecture, the model illustrated in FIG. 13 would include single-string-matching circuits as depicted in FIG. 12.

§4.4 Exemplary Apparatus

Figure 14:
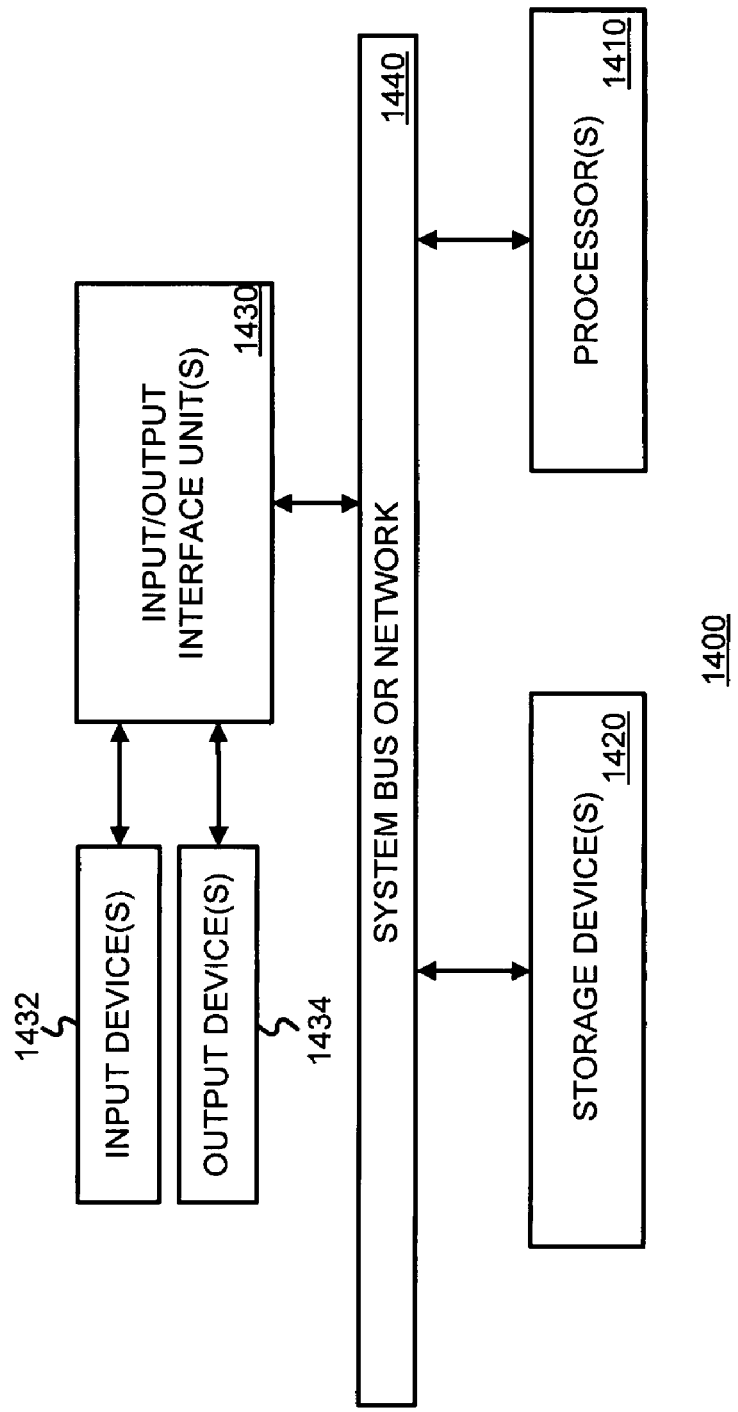
FIG. 14 is a block diagram of an exemplary apparatus that may perform various operations, and store various information generated and/or used by such operations, in a manner consistent with the present invention.

FIG. 14 is high-level block diagram of a machine 1400 that may perform one or more of the processes described above, and/or store information used and/or generated by such processes. The machine 1400 basically includes one or more processors 1410, one or more input/output interface units 1430, one or more storage devices 1420, and one or more system buses and/or networks 1440 for facilitating the communication of information among the coupled elements. One or more input devices 1432 and one or more output devices 1434 may be coupled with the one or more input/output interfaces 1430. The one or more processors 1410 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1420 and/or may be received from an external source via one or more input interface units 1430.

In one embodiment, the machine 1400 may be one or more conventional personal computers, servers, or routers. In this case, the processing units 1410 may be one or more microprocessors. The bus 1440 may include a system bus. The storage devices 1420 may include system memory, such as read only memory (ROM) and/or random access memory (RAM). The storage devices 1420 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1432, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1410 through an appropriate interface 1430 coupled to the system bus 1440. The output devices 1434 may include a monitor or other type of display device, which may also be connected to the system bus 1440 via an appropriate interface. In addition to (or instead of) the monitor, the personal computer may include other (peripheral) output devices (not shown), such as speakers and printers for example.

In the context of communications networks, embodiments consistent with the present invention may filter out most of the irrelevant (i.e., legitimate) traffic without referring to any string matching operation and thus increases the average search rate. Following the data structure, a hardware architecture is presented that tailors this data structure to the NIDPS. The hardware architecture fits into a fraction of a modest FPGA without the need for any external memory. More specifically, using parallel engines, the architecture can provide 10-Gbps throughput in the worst case on a Xilinx Virtex II Pro FPGA. If current state-of-the-art FPGAs are used, the proposed architecture can easily achieve DPI at 40 Gbps. The updates can be done through on-chip memory without any reconfiguration of the on-chip logic (i.e., without any hardware modification), allowing faster response to new attacks. Avoiding external memory access not only improves speed, but also allows parallel designs to fit into the same chip.

Instead of, or in addition to, FPGAs, other hardware, such as ASICS for example, may be used to implement one or more components of various embodiments consistent with the present invention.

Thus, various aspects of embodiments consistent with the present invention may be implemented in hardware and/or software. For example, a TriBiCa data structure may be designed using software, and then provided on a hardware detector.

§4.5 Refinements and Extensions

Although some of the foregoing examples were discussed in terms of "items", such items may be arbitrary-length bit strings. Examples of arbitrary-length bit strings, include, for example, network intrusion signatures, nucleotide sequences, etc.

The following paragraphs consist of an analysis of minimal perfect hashing using TriBiCa. For a given input set, S, the main objective is to provide a minimal perfect hashing for this set S using TriBiCa. In this section, the probability of TriBiCa achieving such a minimal perfect hashing for a given set S is analyzed. To achieve this goal, it is vital to find equal-partitionings for each and every node of the TriBiCa. Analyzing the probability of finding an equal partitioning in a TriBiCa node is started first. Let $N(\eta, \mu)$ represent a TriBiCa node with $\eta$ items and a next node bitmap (NB) of size $\mu$. The simplest case of the equal-partitioning problem is when $\eta=2$. In this case, an equal-partitioning is only possible if the two items occupy two different bins, which can occur with a probability of $(\mu-1)/\mu$. To aid in the analysis for the general case (i.e., when $\eta \geq 2$), a distribution is defined as any subset of the set of non-zero occupancy values (the set Q as defined in §4.2.2.1). Furthermore, a configuration is defined as an equal partitioning that can be achieved from a given distribution. If a total of d distributions $(D_0, \ldots D_{d-1})$ are possible for a node N and each distribution $D_j$ has $c_j$ configurations $(C_{(j,0)}, \ldots, C_{(j,cj-1)})$, then the probability that the distribution $D_j$ occurs in node $N(\eta,\mu)$ can be defined as $$p_{D_j} = \frac{P(\mu, q)\binom{\eta}{u_1}\binom{\eta-u_1}{u_2}\cdots\binom{\eta-\sum_{i=1}^{q-1}u_i}{u_q}}{\mu^\eta R} \quad (3)$$

where $P(\mu, q)$ shows permutation. Equation (3) can be read as selecting q bins out of the $\mu$ possible bins in the node, then selecting $\mu_1$ items from the input set to put into these bins, where at each step, the items are selected from the items remaining from the previous steps. The $\mu^\eta$ shows total possible ways to distribute $\eta$ items into $\mu$ bins. It is possible that, one occupancy value, $\mu_1$ can be repeated in more than one bin and re-ordering these bins in the distribution does not change the distribution. To avoid counting the same distribution more than once, a repeat factor R is added to (3). R is the product of all $r(\mu_1)$ factorials, where each $r(\mu_1)$ is the number of repetitions of the occupancy value $\mu_1$ in the given distribution. $c_j$, the number of configurations corresponding to each distribution can be determined by counting the number of subsets of $D_j$ that have a sum of $\eta/2$. The expected number of configurations (or equal partitionings) for this node can be given as in (4). Note that, for TriBiCa, since all nodes in the same level have the same memory, E[C] is the same for all nodes at the same level with the same number of items, $\eta$.

$$E[C_N] = \sum_{j=0}^{d-1} p_{D_j} c_j \quad (4)$$

For instance, for N(4, 8) a four-item node, with a load factor of 0.5, there are five distributions, $D_1=\{1, 1, 1, 1\}$, $D_2=\{1, 1, 2\}$, $D_3=\{1, 3\}$, $D_4=\{2, 2\}$, and $D_5=\{4\}$. Two of these distributions ($D_3$ and $D_5$) have no equal partitionings, i.e., have no configurations. On the other hand, $D_1$ has three configurations ($c_1=3$). Any of the two items in $D_1$ can be partitioned into the same group resulting in an equal partitioning. There are $\binom{4}{2}=6$ such groups. Since it does not matter whether the group is the left or right group, the total number of configurations for $D_1$ is 3. $D_2$ and $D_4$ provides one equal partitioning each ($C_{(2,0)}=\{(1, 1), (2)\}$ and $C_{(4,0)}=\{(2), (2)\}$, where items in the same group are enclosed in parentheses.). From (3), $\rho_j$ values can be calculated as $\rho_1=0.41016$, $\rho_2=0.49219$, $\rho_3=0.054688$, $\rho_4=0.041016$, and $\rho_5=0.0019531$. The probability that this node can give an equal partitioning for a random set of inputs is $P_N=\rho_1+\rho_2+\rho_4=0.94$. The expected number of configurations for this node from (4) is 1.76.

This concludes the analysis for equal partitionings for a single isolated node. Now, the effect of the trie structure of TriBiCa in increasing the success probability of the equal partitionings is discussed. Suppose a set of items is programmed into TriBiCa and it is desired to find out the probability that equal partitioning for all nodes takes place. The trie structure allows the items programmed into the nodes to be organized in different ways, based on the possible configurations in their ancestor nodes in the previous levels. For instance, for the example above, N(4, 8) can have up to three configurations depending on its distribution. This means if an N(4, 8) has distribution $d_1$, its child nodes will have three chances to find an equal partition if they are in the trie structure, instead of one chance if they were single isolated nodes. The exemplary Greedy technique described above, uses the trie structure to find an equal partitioning and eventually a minimal perfect hashing by trying all possible configurations at the low levels. High levels have a higher success probability of equal partitioning, so the exemplary Blackjack technique, described above, relies on single node equal partitioning. The following analysis will focus on partitioning low-level nodes using the Greedy technique to show the impact of the trie structure on achieving minimal perfect hashing with TriBiCa. Let S(l) represent a super node with l levels. Then, the success probability of achieving minimal perfect hashing for a set with $2^l$ items using a super node S(l) can be defined recursively with the initial condition of $\phi_0=P_{last}$ as, $$\phi_l = [1-(1-\phi^2_{l-1})^{E_{root}}] P_{root} \quad (5)$$

where $P_{root}$ and $P_{last}$ show the probability of equal partitioning for the root node and a last level node of S(l), respectively, if they were isolated single nodes. $E_{root}$ shows the expected number of configurations at the root node of the super node. A TriBiCa with $\eta$ items requires $\eta/2^l$ such super nodes. Assuming the probability of achieving equal partitions for all high-level nodes is $P_H$, the success probability for minimal perfect hashing with a TriBiCa using S(l) is, $$\phi = P_H \phi_l^{\frac{n}{2^l}}. \quad (6)$$

The following paragraphs discuss improvement to the basic data structure of TriBiCa. The basic TriBiCa data structure uses a binary trie with $\lceil \log_2(n) \rceil$ levels where at each level, the items in each node are divided into two equally sized groups. TriBiCa can be generalized to use a k-ary trie where each node has k child nodes and the items in each node are divided into k equally sized groups ($k \geq 2$ and k may also differ between levels). In this section, this k-ary trie option for TriBiCa is investigated and it is shown that this option reduces memory and increases scalability.

Figure 15:
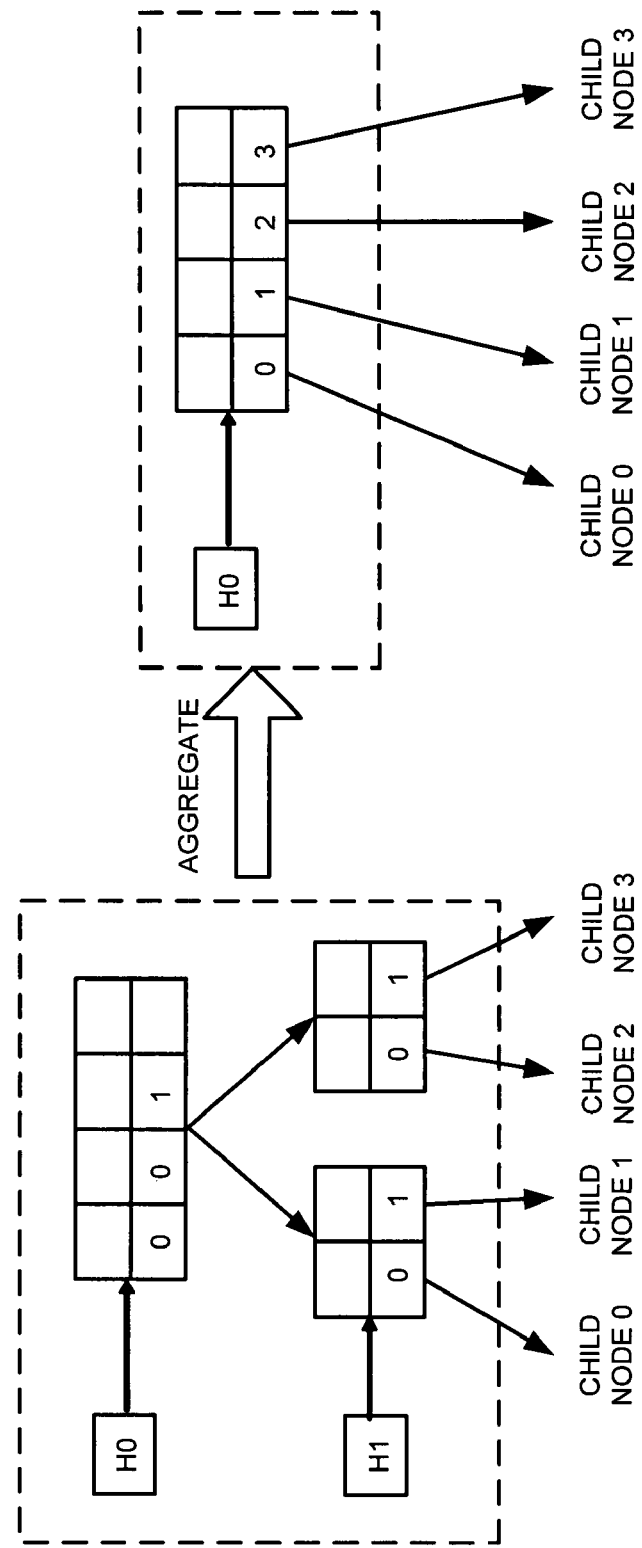
FIG. 15 illustrates level aggregation in a k-ary trie of a TriBiCa data structure, in a manner consistent with the present invention.

One way to achieve a k-ary trie for k>2 is to aggregate multiple levels into a single level as shown in FIG. 15. When levels are aggregated into a single level, all path decisions corresponding to the original levels can be done in the single aggregated level by referring to the single aggregated NB of this node. For instance in FIG. 15, at each level only one address bit is revealed before aggregation. Thus to choose the child node out of the four leaf nodes, two levels are required. After aggregation, one level is enough to choose the next node out of the four nodes represented by the 2 bits in each NB bin.

Note that aggregation only allows k values that are a power of two, which is still suitable for simple addressing using the path in the trie. Note that it is also trivial to have node with arbitrary k values (e.g., k=3) but then path cannot be used for simple addressing.

Four points are noteworthy for aggregated levels. First, a single hash function is used to address the bitmaps. Second, each NB bin has log(k) bits to represent k different children. Third, the number of levels is reduced by log(k)−1. Fourth, the DBs are merged and not aggregated (i.e., the aggregated node has a single DB).

For small data sets the efficient structure of TriBiCa levels make them too small for typical on-chip memory unit sizes. As a result, number of memory units that can be accessed concurrently (i.e., Block RAMs (BR)), rather than the total memory size, determines the scalability. Aggregating levels allow multiple levels to be packed together and accessed in one memory access, which increases the scalability of TriBiCa. For instance, the basic structure with two levels, uses two memory accesses/lookups, whereas the aggregated node in FIG. 15 requires only one access. Although the logic is vast, reduction of hash functions can improve scalability for chips with very limited logic resources.

Since, the aggregated levels share the same DB, the total DB memory is reduced. For instance, a level with m bins uses a total of 2·m bits for DB and NB. In the basic data structure l such levels require 2·l·m bits. However, if these l levels are aggregated they will share a single DB, thus the memory requirement will reduce to (l+1)·m bits.

§4.6 Conclusions

Embodiments consistent with the present invention provide a high-speed, scalable, and easily updateable data structure. Specifically, the data structure is relatively small and its size may scale with the number of strings and the average string size in the set. In addition, the updates can be achieved without hardware modifications. The proposed data structure, called TriBiCa(Trie Bitmap Content Analyzer), provides minimal perfect hashing functionality while intrinsically supporting low-cost set-membership queries. In other words, in some embodiments, it provides at most one match candidate in the signature set that is used to match the query.

In the context of communications networks, embodiments consistent with the present invention may filter out most of the irrelevant (i.e., legitimate) traffic without referring to any string matching operation and thus increases the average search rate. Following the data structure, a hardware architecture is presented that tailors this data structure to the NIDPS.

An exemplary hardware architecture fits into a fraction of a modest FPGA without the need for any external memory. More specifically, using parallel engines, the architecture can provide 10-Gbps throughput in the worst case on a Xilinx Virtex II Pro FPGA. If current state-of-the-art FPGAs are used, the proposed architecture can easily achieve DPI at 40 Gbps. The updates can be done through on-chip memory without any reconfiguration of the on-chip logic (i.e., without any hardware modification), allowing faster response to new attacks. Avoiding external memory access not only improves speed, but also allows parallel designs to fit into the same chip.

What is claimed is:

1. A method for generating a hierarchical data structure associated with a plurality of arbitrary-length bit strings, the method comprising:
   a) hashing, for each of the plurality of arbitrary-length bit strings, the arbitrary-length bit string;
   b) partitioning, for each of the plurality of arbitrary-length bit strings, results of the hashing to a next level of the hierarchical data structure to generate partition results;
   c) defining a next level bit map based on the partition results;
   d) repeating acts (a) through (c); and
   e) storing, for each of the plurality of arbitrary-length bit strings, the arbitrary-length bit string or a pointer thereto, in a memory location,
      wherein a hash of one of the arbitrary-length bit strings at each level of the hierarchical data structure defines a bit location of the next level bit map, and
      wherein a concatenation of at least one bit starting at the defined bit location of the next level bit map at each level of the hierarchical data structure defines an address of the memory location storing the arbitrary-length bit string or a pointer thereto.

2. The method of claim 1 wherein acts (a) through (c) are repeated until further partitioning is not possible.

3. The method of claim 1 wherein the hierarchical data structure is a K-ary trie, where K is a whole number greater than or equal to 2.

4. The method of claim 3 wherein the hierarchical data structure provides a perfect hashing function.

5. The method of claim 1 wherein the hierarchical data structure is a K-ary trie, where K is an integer power of 2 and wherein the hierarchical data structure provides a minimal perfect hashing function.

6. The method of claim 1 wherein the hierarchical data structure is a binary trie.

7. The method of claim 6 wherein the hierarchical data structure provides a minimal perfect hashing function.

8. The method of claim 1 wherein the arbitrary-length bit string is a communications network intrusion signature.

9. The method of claim 1 wherein the arbitrary-length bit string is a nucleotide sequence.

10. The method of claim 1 wherein acts (a)-(d) comprise:
    for each of the plurality of arbitrary-length bit strings,
       1) hashing the arbitrary-length bit string, using a first hashing function, to determine a bit location of a data bit map,
       2) setting a bit of the data bit map at the determined bit location to "1", and
       3) incrementing a count of an occupancy map corresponding to the determined bit location;
    partitioning the arbitrary-length bit strings using counts of the occupancy table to
       1) determine, for each of the arbitrary-length bit strings, whether the arbitrary length bit string will be hashed to a first of two sub-data bit maps or a second of two sub-data bit maps;
       2) generate a next node bit map, having a same number of bits as the data bit map, wherein, for each of a plurality of bit locations of the next node bit map, a value at the bit location is set to "0" if an arbitrary length bit string hashed to the corresponding bit location of the data bit map is to be hashed to the first of the two sub-data bit maps, and is set to "1" if an arbitrary length bit string hashed to the corresponding bit location of the data bit map is to be hashed to the second of the two sub-data bit maps, and
    for each of the plurality of arbitrary-length bit strings,
       1) hashing the arbitrary length bit string, using a second hashing function, to determine a bit location of the sub-data bit map to which the arbitrary length bit string has been partitioned,
       2) setting a bit of the sub-data bit map to which the arbitrary length bit string has been partitioned, at the determined bit location, to "1", and
       3) incrementing a count of a first or second sub-occupancy map corresponding to the determined bit location of the first or second sub-data bit map; and
    for each of the sub-data bit maps, repeating acts (b) and (c) to generate two further sub-data bit maps until each of the two further sub-data bit maps has an occupancy count of 1 or less.

11. The method of claim 1 wherein the act of partitioning uses a greedy algorithm.

12. The method of claim 1 wherein the act of partitioning uses a blackjack algorithm.

13. The method of claim 1 wherein at least one of the acts of partitioning uses a blackjack algorithm and at least one subsequent act of partitioning uses a greedy algorithm.

14. Apparatus for generating a hierarchical data structure associated with a plurality of arbitrary-length bit strings, the apparatus comprising: at least one processor programmed to:
    a) hash, for each of the plurality of arbitrary-length bit strings, the arbitrary-length bit string,
    b) partition, for each of the plurality of arbitrary-length bit strings, results of the hashing to a next level of the hierarchical data structure to generate partition results, and
    c) define a next level bit map based on the partition results; and a storage device storing, for each of the plurality of arbitrary-length bit strings, the arbitrary-length bit string or a pointer thereto, in a memory location,
       wherein a hash of one of the arbitrary-length bit strings at each level of the hierarchical data structure defines a bit location of the next level bit map, and
       wherein a concatenation of at least one bit starting at the defined bit location of the next level bit map at each level of the hierarchical data structure defines an address of the memory location storing the arbitrary-length bit string or a pointer thereto.

15. The apparatus of claim 14 wherein the hierarchical data structure is a K-ary trie, where K is a whole number greater than or equal to 2.

16. The apparatus of claim 15 wherein the hierarchical data structure provides a perfect hashing function.

17. The apparatus of claim 14 wherein the hierarchical data structure is a K-ary trie, where K is an integer power of 2 and wherein the hierarchical data structure provides a minimal perfect hashing function.

18. The apparatus of claim 14 wherein the hierarchical data structure is a binary trie.

19. The apparatus of claim 18 wherein the hierarchical data structure provides a minimal perfect hashing function.

20. The apparatus of claim 14 wherein the arbitrary-length bit string is a communications network intrusion signature.

21. The apparatus of claim 14 wherein the arbitrary-length bit string is a nucleotide sequence.

22. The apparatus of claim 14 wherein the at least one processor uses a greedy algorithm for the partitioning.

23. The apparatus of claim 14 wherein the at least one processor uses a blackjack algorithm for the partitioning.

24. The apparatus of claim 14 wherein the at least one processor uses a blackjack algorithm and then uses a greedy algorithm for the partitioning.

25. The apparatus of claim 14 wherein the at least one processor includes at least one of (A) a microprocessor, (B) a field programmable gate array, and (C) an application specific integrated circuit.

* * * * *